(12) United States Patent
Smith et al.

(10) Patent No.: US 10,607,304 B2
(45) Date of Patent: Mar. 31, 2020

(54) METHOD AND SYSTEM FOR TRANSPORTATION RESOURCE GROUPING AND REALLOCATION

(71) Applicant: Arpent, LLC, Colorado Springs, CO (US)

(72) Inventors: Clint Smith, Warwick, NY (US); Samuel Smith, Warwick, NY (US); Declan Ganley, Galway (IE)

(73) Assignee: Arpent, LLC, Dublin (IE)

( * ) Notice: Subject to any disclaimer, the term of this patent is extended or adjusted under 35 U.S.C. 154(b) by 886 days.

(21) Appl. No.: 15/040,441

(22) Filed: Feb. 10, 2016

(65) Prior Publication Data

US 2016/0232627 A1  Aug. 11, 2016

Related U.S. Application Data

(60) Provisional application No. 62/114,956, filed on Feb. 11, 2015.

(51) Int. Cl.
*G06Q 30/00* (2012.01)
*G06Q 50/14* (2012.01)
(Continued)

(52) U.S. Cl.
CPC .............. *G06Q 50/14* (2013.01); *G06F 16/29* (2019.01); *G06Q 30/0611* (2013.01);
(Continued)

(58) Field of Classification Search
CPC .............. G06Q 50/14; G06Q 30/0611; G06Q 30/0645; G06Q 30/08; G06F 17/30241; G07B 15/06

See application file for complete search history.

(56) References Cited

U.S. PATENT DOCUMENTS

2003/0020634 A1   1/2003  Banerjee et al.
2008/0133425 A1*  6/2008  Grush ................ G06Q 10/0637
                                                           705/80
(Continued)

OTHER PUBLICATIONS

Zheng Qin, "Introduction to E-commerce", 2009, Springer, springer.com (Year: 2009).*

(Continued)

*Primary Examiner* — Naeem U Haq
*Assistant Examiner* — Norman Donald Sutch, Jr.
(74) *Attorney, Agent, or Firm* — The Marbury Law Group, PLLC

(57) ABSTRACT

Systems and methods for dynamic transportation resource arbitrage (DTRA) may include configuring a server to dynamically manage the use of transportation resources. The server may identify, analyze, organize, and/or package available transportation resources (e.g., segments of roadways in a geographical area, etc.) as granular vehicular occupancy opportunity (VOO) elements/units that each identify an amount of a resource that is offered for allocation and use to travelers. The granular VOO elements/units may be well-defined, discrete, standardized, combinable, and/or fungible information structures or units that are suitable for comparison and/or mutual substitution. The server computing device may combine the granular VOOs to cover a specific corridor (e.g., an area that encompasses ten miles of the left lane of a highway, etc.), and dynamically offer a vehicle the right to access and use the transportation resources identified by a combination of VOOs.

21 Claims, 22 Drawing Sheets

(51) Int. Cl.
  *G06Q 30/06* (2012.01)
  *G06Q 30/08* (2012.01)
  *G06F 16/29* (2019.01)
  *G07B 15/06* (2011.01)
(52) U.S. Cl.
  CPC ......... *G06Q 30/0645* (2013.01); *G06Q 30/08* (2013.01); *G07B 15/063* (2013.01)

(56) References Cited

U.S. PATENT DOCUMENTS

| | | | | |
|---|---|---|---|---|
| 2010/0250292 | A1* | 9/2010 | Wurster | G06Q 10/02 705/5 |
| 2012/0310691 | A1* | 12/2012 | Carlsson | G06Q 10/047 705/7.13 |
| 2013/0110739 | A1* | 5/2013 | Hill | G06Q 10/083 705/333 |
| 2014/0278708 | A1* | 9/2014 | Byk | G06Q 10/06315 705/7.25 |
| 2014/0355429 | A1 | 12/2014 | Smith et al. | |

OTHER PUBLICATIONS

Airline Financial News; "DOT Builds A Transportation Index, But Is It Needed?", Feb. 9, 2004; Access Intelligence LLC; p. 1 (Year: 2004).*

Notification of Transmittal of International Search Report and the Written Opinion of the International Searching Authority, or the Declaration in International Application No. PCT/US2016/017468 dated May 18, 2016.

Notification Concerning Transmittal of International Preliminary Report on Patentability (Chapter 1 of the Patent Cooperation Treaty) (PCT Rule 44bis.1(c)) issued for International Application No. PCT/US2016/017468 dated Aug. 24, 2017.

Extended European Search Report received in connection with European Application No. 16749851.8; dated Sep. 25, 2018.

Office Action received in connection with European Application No. 16749851.8; dated Oct. 12, 2018.

* cited by examiner

| Parameter | Value | Description |
|---|---|---|
| 3 Dimensional | Yes | X1,Y1,Z1 and X2,Y2,Z2 (Yes if Z2>0, No if Z2=0) |
| Lease Duration | 60 | Minutes |
| Lease Start Time | 0:00:00 | GMT Time – hh:mm:ss |
| Lease Stop Time | 23:59:59 | GMT Time – hh:mm:ss |
| Lease Start Date | 1/29/2015 | GMT Date - month/day/year |
| Lease Stop Date | 1/30/2015 | GMT Date - month/day/year |
| Resource Type | Roadway | Roadway, Airspace, Bridge, Waterway |
| Resource Segment | Lane | Corridor Types 1-10 |
| Resource Length | 10 | Grid Boundaries |
| Service Class | Truck | Service Class 1-10 |
| Lessor ID | 652 | Lessor ID # |
| Lessor Name | CorpX | Name of the Lessor |

FIG. 3B

| Parameter | Value | Description |
|---|---|---|
| Polygon ID | 16 | ID of Polygon used |
| # BUs | 1000 | number of RUs in lease |
| # Units (X,Y) | 1000 | # cubes at Z=0 where Z =Ground Level |
| # Units (Z>0) | 0 | # Cubes where Z>0 |

FIG. 6C

| L1 → | VOO 11 | VOO 12 | VOO 13 | VOO 14 | VOO 15 | VOO (1x) |
|---|---|---|---|---|---|---|
| L2 → | VOO 21 | VOO 22 | VOO 23 | VOO 24 | VOO 25 | VOO (2x) |

METHOD AND SYSTEM FOR TRANSPORTATION RESOURCE GROUPING AND REALLOCATION

RELATED APPLICATIONS

This application claims the benefit of priority to U.S. Provisional Application No. 62/114,956, titled "Transportation Resource Grouping and Reallocation" filed Feb. 11, 2015, the entire contents of which is hereby incorporated by reference.

BACKGROUND

The increasing use of electric automobiles has led to declining fuel tax revenues, with no reduction in throughput on public roadways. Increased use of roadway charges such as bridge and road tolls may offset a portion of diminished fuel tax income, but motorists may be reluctant to use pay-for-use roadways due to traffic congestion associated with toll plazas. Thus, parts of the roadway go largely unused due to the perceived risk of delay and inconvenience associated with toll roads and bridges. Improved methods and solutions for dynamically allocating roadway resources (e.g., use of particular lanes at particular times of day, etc.) throughout a transportation system for access and use by motorists will be beneficial to roadway owners, service providers, and to the motorists themselves.

SUMMARY

The various aspects include dynamic transportation resource arbitrage (DTRA) methods, which may include generating granular vehicular occupancy opportunity elements/units that each identify an amount of a transportation resource that is offered for allocation and use by travelers with respect to an area, and offering the vehicular occupancy opportunity elements/units for purchase, lease, or trade on a commodities exchange. In an aspect, generating the granular vehicular occupancy opportunity elements/units includes generating vehicular occupancy opportunity elements/units that use a universal standard to identify, quantify, measure, and/or represent the transportation resource.

In a further aspect, generating the granular vehicular occupancy opportunity elements/units may include generating vehicular occupancy opportunity elements/units that identify the transportation resource in a standard format, structure, or unit that is readily understood by the trading community. In a further aspect, generating the granular vehicular occupancy opportunity elements/units includes generating vehicular occupancy opportunity elements/units that include or provide a common reference point against which other vehicular occupancy opportunity elements/units and transportation resources may be compared. In an aspect, the method may include comparing two or more vehicular occupancy opportunity elements/units that represent different resource offerings from different lessor parties to determine the relative economic value of the offered amounts of transportation resource. In a further aspect, generating the granular vehicular occupancy opportunity elements/units may include generating vehicular occupancy opportunity elements/units that define an amount of distance along a section of transportation grid in relation to a geographic area encompassing one cubic meter. In a further aspect, generating the granular vehicular occupancy opportunity elements/units may include generating vehicular occupancy opportunity elements/units that may be combined to cover a precise location or area.

In an aspect, the method may include combining the vehicular occupancy opportunity elements/units to cover an area that encompasses a highway, bridge, navigation path, waterway, or air traffic corridor. In an aspect, the method may include receiving bids for the offered vehicular occupancy opportunity element/unit, determining one or more winning bids associated with registered users, submitting the winning bids to a charging system for payment, and allocating the vehicular occupancy opportunity elements/units to users having winning bids. In a further aspect, offering the vehicular occupancy opportunity elements/units for purchase, lease, or trade on a commodities exchange may include grouping the vehicular occupancy opportunity elements/units to form a polygon, and offering the group of vehicular occupancy opportunity elements/units for purchase, lease, or trade on the commodities exchange.

Further aspects include a server computing device that includes a memory and a processor coupled to the memory, in which the processor is configured with processor-executable instructions to perform operations that include generating granular vehicular occupancy opportunity elements/units that each identify an amount of a transportation resource that is offered for allocation and use by travelers with respect to an area, and offering the vehicular occupancy opportunity elements/units for purchase, lease, or trade on a commodities exchange. In an aspect, the processor may be configured with processor-executable instructions to perform operations such that generating the granular vehicular occupancy opportunity elements/units includes generating vehicular occupancy opportunity elements/units that use a universal standard to identify, quantify, measure, and/or represent the transportation resource.

In a further aspect, the processor may be configured with processor-executable instructions to perform operations such that generating the granular vehicular occupancy opportunity elements/units includes generating vehicular occupancy opportunity elements/units that identify the transportation resource in a standard format, structure, or unit that is readily understood by the trading community. In a further aspect, the processor may be configured with processor-executable instructions to perform operations such that generating the granular vehicular occupancy opportunity elements/units includes generating vehicular occupancy opportunity elements/units that include or provide a common reference point against which other vehicular occupancy opportunity elements/units and transportation resources may be compared. In a further aspect, the processor may be configured with processor-executable instructions to perform operations further including comparing two or more vehicular occupancy opportunity elements/units that represent different resource offerings from different lessor parties to determine the relative economic value of the offered amounts of transportation resource. In a further aspect, the processor may be configured with processor-executable instructions to perform operations such that generating the granular vehicular occupancy opportunity elements/units includes generating vehicular occupancy opportunity elements/units that define an amount of distance along a section of transportation grid in relation to a geographic area encompassing one cubic meter. In a further aspect, the processor may be configured with processor-executable instructions to perform operations such that generating the granular vehicular occupancy opportunity elements/units includes generating vehicular occupancy opportunity elements/units that may be combined to cover a precise location or area.

In a further aspect, the processor may be configured with processor-executable instructions to perform operations further including combining the vehicular occupancy opportunity elements/units to cover an area that encompasses a highway, bridge, navigation path, waterway, or air traffic corridor. In a further aspect, the processor may be configured with processor-executable instructions to perform operations further including receiving bids for the offered vehicular occupancy opportunity element/unit, determining one or more winning bids associated with registered users, submitting the winning bids to a charging system for payment, and allocating the vehicular occupancy opportunity elements/units to users having winning bids. In a further aspect, the processor may be configured with processor-executable instructions to perform operations such that offering the vehicular occupancy opportunity elements/units for purchase, lease, or trade on a commodities exchange includes grouping the vehicular occupancy opportunity elements/units to form a polygon, and offering the group of vehicular occupancy opportunity elements/units for purchase, lease, or trade on the commodities exchange. Further aspects include a non-transitory computer readable storage medium having stored thereon processor-executable software instructions configured to cause a processor to perform operations including generating granular vehicular occupancy opportunity elements/units that each identify an amount of a transportation resource that is offered for allocation and use by travelers with respect to an area, and offering the vehicular occupancy opportunity elements/units for purchase, lease, or trade on a commodities exchange. In an aspect, the stored processor-executable software instructions may be configured to cause a processor to perform operations such that generating the granular vehicular occupancy opportunity elements/units includes generating vehicular occupancy opportunity elements/units that use a universal standard to identify, quantify, measure, and/or represent the transportation resource.

In a further aspect, the stored processor-executable software instructions may be configured to cause a processor to perform operations such that generating the granular vehicular occupancy opportunity elements/units includes generating vehicular occupancy opportunity elements/units that identify the transportation resource in a standard format, structure, or unit that is readily understood by the trading community. In a further aspect, the stored processor-executable software instructions may be configured to cause a processor to perform operations such that generating the granular vehicular occupancy opportunity elements/units includes generating vehicular occupancy opportunity elements/units that include or provide a common reference point against which other vehicular occupancy opportunity elements/units and transportation resources may be compared. In a further aspect, the stored processor-executable software instructions may be configured to cause a processor to perform operations further including comparing two or more vehicular occupancy opportunity elements/units that represent different resource offerings from different lessor parties to determine the relative economic value of the offered amounts of transportation resource. In a further aspect, the stored processor-executable software instructions may be configured to cause a processor to perform operations such that generating the granular vehicular occupancy opportunity elements/units includes generating vehicular occupancy opportunity elements/units that define an amount of distance along a section of transportation grid in relation to a geographic area encompassing one cubic meter. In a further aspect, the stored processor-executable software instructions may be configured to cause a processor to perform operations such that generating the granular vehicular occupancy opportunity elements/units includes generating vehicular occupancy opportunity elements/units that may be combined to cover a precise location or area.

In a further aspect, the stored processor-executable software instructions may be configured to cause a processor to perform operations that further include combining the vehicular occupancy opportunity elements/units to cover an area that encompasses a highway, bridge, navigation path, waterway, or air traffic corridor. In a further aspect, the stored processor-executable software instructions may be configured to cause a processor to perform operations that further include receiving bids for the offered vehicular occupancy opportunity element/unit, determining one or more winning bids associated with registered users, submitting the winning bids to a charging system for payment, and allocating the vehicular occupancy opportunity elements/units to users having winning bids. In a further aspect, the stored processor-executable software instructions may be configured to cause a processor to perform operations such that offering the vehicular occupancy opportunity elements/units for purchase, lease, or trade on a commodities exchange includes grouping the vehicular occupancy opportunity elements/units to form a polygon, and offering the group of vehicular occupancy opportunity elements/units for purchase, lease, or trade on the commodities exchange.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention.

FIGS. 3A through 12 illustrate various shapes, characteristics, features, and data fields that may be associated with a vehicular occupancy opportunity element/unit or vehicular occupancy opportunity element/unit grouping in accordance with the various embodiments.

FIG. 15 is a corridor configuration vehicular occupancy opportunity element/unit grouping in accordance with the various embodiments.

DETAILED DESCRIPTION

Figure 1A:
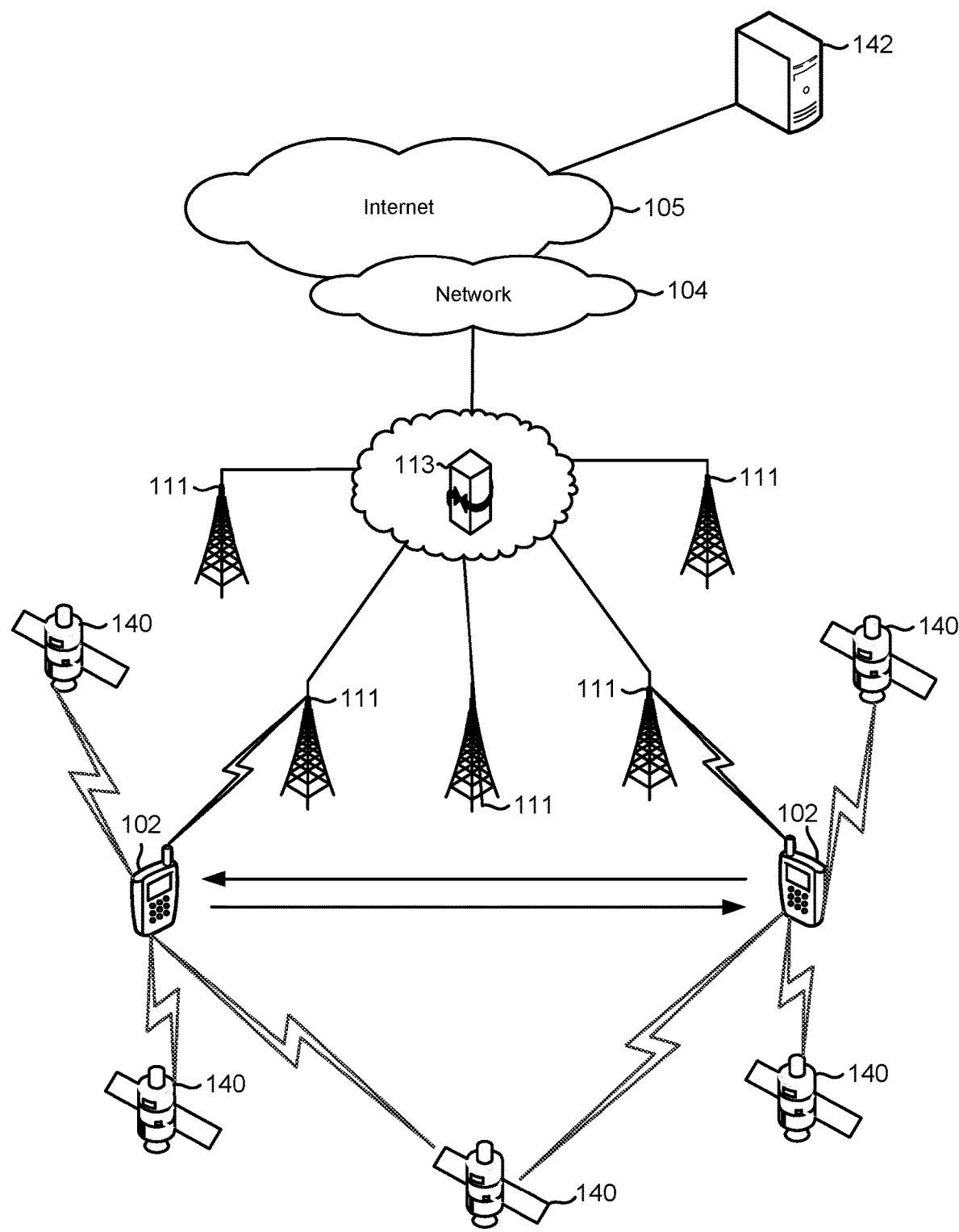
FIGS. 1A through 1C are system block diagrams illustrating various logical and functions components and communication links in communication systems that may be used to implement the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the various embodiments include methods, and systems and components (e.g., server computing devices, vehicle control systems, vehicle console units, mobile devices, and/or other similar computing systems) configured to implement the methods, for dynamically managing the availability, allocation, access, and use of transportation resources, such as roadways air traffic corridors, waterways, canals, etc. As part of these operations, the systems/components may be configured to generate granular vehicular occupancy opportunity (VOO) elements or units, which may be information structures that each includes information identifying an area and an aspect of a transportation resource (e.g., rights to use a segment of road during certain time periods, etc.) that is offered for allocation, assignment, lease, distribution or use with respect to the area. The systems/components (e.g., server computing devices, etc.) may also be configured to offer the VOOs for purchase, lease, or trade to other systems or components. By generating and using such VOOs, the various embodiments may reduce the computational complexity associated with comparing different resource offerings, and/or may allow commodity traders to more readily compare and valuate different transportation resource offerings from different areas.

Modern mobile electronic devices (e.g., mobile phones) and transportation vehicles typically include one or more geospatial positioning systems/components for determining their current geographic location. Location information obtained by these geospatial systems may be used by location-aware mobile software applications (e.g., Google® Maps, Yelp®, Twitter® Places, "Find my Friends" on Apple®, etc.) to provide users with information regarding their physical location at a given point in time. In recent years, such location-based services and software applications have increased in popularity and use, and now enable their users to navigate cities, read reviews of nearby restaurants and services, track assets or friends, obtain location-based safety advice, and/or take advantage of many other location-based services wirelessly, almost anywhere and at any time. The various embodiments include computing systems that are configured to work in conjunction with, or collect location information from, such location-based services and software applications to dynamically manage the availability, allocation, access, and use of transportation resources and/or vehicular occupancy opportunity elements/units.

Various embodiments may include computing systems that are configured to collect, generate, compute, and/or make use of location information pertaining to a mobile device or vehicle. A computing system may be configured to use such location information to provide and/or implement a variety of location-based services, including a location based tracking service for monitoring or tracking the movements of a transportation vehicle along a segment of a transportation grid to determine whether the transportation vehicle has the rights to access and/or use the transportation resource and/or to bill a vehicle operator for usage of the transportation resource or specific segments of the transportation grid.

For example, a computing system that is configured to perform location based tracking operations in accordance with the various embodiments may perform operations that include determining the segment of the transportation grid that a vehicle is using, determining the lane in which that the vehicle is currently travelling/located, determining a current billing rate for a specific transportation grid segment at or near the vehicle's current position, comparing a vehicle's current location to/against previous or subsequent location information to determine the distance that the vehicle travels, travelled, or will travel within specific segments of the transportation grid, and other operations for collecting, generating, computing, or using location information pertaining to a mobile device or vehicle. The computing system may also collect, analyze and use the location based information (e.g., tracking information, distance information, lane/segment usage information, vehicular occupancy opportunity element/unit usage information, etc.) for the purposes of billing a vehicle operator based on usage of specific segments of the transportation grid.

The computing system may be configured to collect, generate or make use of location information that is obtained via one of a device centric approach, a network centric approach, and a hybrid approach that may include aspects of both the device centric and network centric approaches. As an example of a device centric approach, the computing system in a vehicle may be configured to receive (e.g., via a GPS receiver, etc.) radio signals emitted by satellites, measure the time required for the signals to reach the vehicle, use trilateration techniques to determine the geographical coordinates (e.g., latitude and longitude coordinates) of the vehicle, and send the geographical coordinates to a server in a communication network at various times and/or in response to various conditions or events. As an example of a network centric approach, the computing system in a vehicle may be configured to transmit radio signals for reception by one or more (e.g., typically three) radio access points having installed thereon additional radio equipment for measuring the location of the vehicles/devices in the system. The radio access points may receive the transmitted signals, measure the signal strength and/or radio energy of the received signals to determine the location of the vehicle or computing system, and send the location information to the vehicle/system.

In various embodiments, the computing system may include, or may be included in, a dynamic transportation resource arbitrage (DTRA) system. The DTRA system may be configured to dynamically manage the availability, allocation, access, and use of transportation resources, such as roadways air traffic corridors, waterways, canals, etc., between transportation vehicle operators. The DTRA system may allow users and owners of segments of a transportation grid (e.g., a "lessee" and "lessor" of the segment) to collaborate and make better use of the available transportation resources.

In some embodiments, the DTRA system may be configured to allow for leasing specific segments of a lessor's portion of transportation grid to vehicle operators for a cost. For example, the DTRA system may include components that are configured to determine a vehicle operator's current location, determine the vehicle operator's current, intended, or future destinations (or likely destinations), determine the transportation resources that are suitable for use by the operator in transporting the vehicle to the destinations within one or more time periods, determine the transportation resources that are available for use by the operator (e.g., privately owned road segments that are offered for lease by a lessor, road segments that are currently not congested, road segments in which vehicles are currently traveling at the posted speed limit, etc.), notify the vehicle operator of the available transportation resources and an auction start time (e.g., by sending a notification message, etc.), conduct an auction for the available transportation resources among participating vehicle operators, receive offers or bids, identify a participant that submitted highest offer or bid as the winner of the auction, request payment from a charging system, and allocate the rights to use the available resources (e.g., the owner/lessor's segment of the transportation grid, etc.) to a vehicle associated with the identified participant (or the winner of the auction, consumer willing to pay the auction price, etc.).

In some embodiments, the DTRA system may include or communicate with a transportation resource commodity exchange (TRCE) component that is configured to utilize the features provided by the DTRA system to conduct or manage the auction for the available resources (e.g., transportation resources, road segments, etc.). The TRCE component may be configured to allow participating resource owners, investors, speculators, and new entrants (collectively "participants") to buy, sell, exchange, and invest in transportation resources. In an embodiment, the TRCE component may be configured to pool the transportation resources that are offered or made available, such as multiple lanes of a highway or multiple adjacent segments that connect two cities, and conduct a resource auction for all or portions of the resources in the resource pool. As part of these operations, the TRCE component may receive resource bids from multiple participants, identify the participant(s) that submitted highest bid(s) as the winner(s) of the resource auction, submit the winning bids to a charging system for payment, and allocate the auctioned resources to the winning participant.

Thus, the TRCE component allows participating transportation resource owners to make more efficient use of their excess transportation resources by allowing them to sell or dynamically offer for lease (either short term or long term) these resources to the highest bidder. The TRCE component also allows participating resource owners to lease resources from other transportation resource owners at competitive market rates that more accurately reflect the economic principles of supply and demand.

In addition, the TRCE component may allow participants to invest in future allocations of the transportation resources. For example, the TRCE component may be configured to allow a participant to buy or sell futures contracts in segments of a lane of a highway. Such futures contracts may provide an assurance that a lessor will allocate a specified segment of the lane of the highway to a lessee at a future date (and for a period of time) for a presently agreed upon price. This, in turn, allows the lessee to better manage or hedge against future costs, or to speculate regarding future increases or decreases in the costs or demand for transportation resources.

Transportation resources are typically associated with a physical or semi-physical resource boundary, such as a lane, bridge, an exit ramp, a license area, subset of a license area, etc. Such resource boundaries may vary based on the resource, the transportation grid, or the allocation scheme used for allocating the resource. In some embodiments, the DTRA system may generate and use polygons to define the geographic areas in which a transportation vehicle of a lessee is authorized to use an allocated transportation resource. Yet, polygons generated via the use of existing solutions or techniques may not be well suited for use in representing a transportation resource. This is because the shape and size of the polygons may differ based on the resource, the transportation grid, maintenance that modifies its geographic boundaries, or the allocation scheme used to allocate the resource. These and other differences may increase the computational complexity associated with appraising or comparing different transportation resource offerings from different components of a transportation grid or different transportation grids, and make it more challenging to determine the relative economic value of a transportation resource that is offered for sale or lease. These and other challenges may discourage or detract investors from investing in or trading transportation resources alongside more traditional commodities, such as gold, oil, or natural gas. These challenges may also limit the DTRA system's ability to efficiently offer transportation resources for purchase, lease, or trade as a commodity.

To better support the trade of transportation resources as a commodity, the various embodiments include components configured to identify, define, quantify, pool, partition, organize, and/or package transportation resources into well-defined, granular, discrete, standardized, and fungible vehicular occupancy opportunity (VOO) elements/units that are well suited for comparison and/or mutual substitution. These VOOs may allow the DTRA system to offer the transportation resources for purchase, lease, or trade on a commodities exchange alongside more traditional commodities, such as gold, oil, and natural gas. The VOOs also may allow the DTRA system to present transportation resources to investors in a format, structure, or in units that are more readily understood by the trading community. As such, the various embodiments allow the DTRA system to efficiently offer and trade transportation resources in a commodity exchange system.

The various embodiments may include components configured to generate vehicular occupancy opportunity (VOO) elements/units that use a universal standard to identify, quantify, measure, and/or represent the transportation resources. Such VOOs may include or provide a common reference point against which other VOOs and transportation resources may be compared. This reduces the computational complexity associated with comparing different resource offerings from different components of a transportation grid or different transportation grids, and allows commodity traders to more readily compare and valuate different resource offerings from different networks.

Some embodiments may include components configured to generate the vehicular occupancy opportunity (VOO) elements/units so that they define each transportation resource granularly, in relation to an area, resource boundary, traffic volume, usage times, and/or so that the resulting VOOs may be combined. For example, the components may generate the VOOs so that they define a distance of road (e.g., 20 miles) in relation to a well-defined resource boundary (e.g., a geographic area encompassing one cubic meter, one square kilometer, etc.) and/or duration for use. Such VOOs may be combined to create a resource boundary that covers a precise time interval, location, or area, such as an area that encompasses one or more lanes of a highway but excludes its surrounding office buildings. This provides the participants with fine grain controls over the resources they offer, lease or purchase. For example, by generating granular and combinable VOOs that each define a specific resource with respect to a relatively small and well-defined area (e.g., 20 miles of a highway lane three meters in width) and time period (e.g., between 5:00 AM and 7:00 AM, month of January, etc.), the various embodiments allow lessees to purchase/lease only the resources they require (e.g., the left-hand lane of a highway during peak traffic time, etc.) and lessors to more narrowly slice their available resources so that they may be priced more competitively and/or leased to more consumers.

Some embodiments may include components configured to generate the vehicular occupancy opportunity (VOO) elements/units so that they include information identifying various characteristics and/or properties of the transportation resource or offering, such as the peak traffic times and traffic flow volume supported or compatible with the offered resource, the geographic area(s) in which the resource is offered for use, a resource availability time or date, a resource expiration time, a lease duration, lease start and stop times or dates, peak usage rates and times, average resource usage, and other similar information. Additional information that may be computed for, included in, and/or associated with the vehicular occupancy opportunity element/unit include the average speed, congestion, traffic, commuting, or usage information for the transportation resource as well as for surrounding resources, the surrounding geographical areas, relevant cities, etc.

Some embodiments may include components configured to generate the vehicular occupancy opportunity (VOO) elements/units so that they use universal standards or units to identify or describe the characteristics/properties of the transportation resource or offering. This allows the DTRA system, participants, and analysts to more directly compare VOOs that represent different resources. This, in turn, reduces the computational complexity associated with determining the relative economic value of a transportation resource that is offered for sale or lease.

Some embodiments may include components configured to classify or grade the transportation resources or VOOs. The components may classify/grade a vehicular occupancy opportunity element/unit based on the properties or characteristics of its underlying resource. For example, similar to how oil is graded as "sweet" or "sour" based on its sulfur content and "light" or "heavy" based on its relative density, the components may generate, classify, categorize, package, group, label, and/or offer transportation resources and/or vehicular occupancy opportunity elements/units as graded units (e.g., as wide, narrow, fast, slow, prime, junk, premium, discount, light, heavy, durable, non-durable, hard, soft, etc.).

In some embodiments, the DTRA system may include components that are configured to offer the VOOs for purchase or lease on the commodity exchange based on their grade or classification. This allows the commodity traders (and other participants) to better understand the properties and characteristics of the resources offered by a vehicular occupancy opportunity element/unit, which in turn allows them to more accurately determine the relative economic values of that vehicular occupancy opportunity element/unit.

Various embodiments may include components configured to generate the VOOs so that they represent a transportation resource (e.g., bridge, highway lane, local roadway, waterway, etc.) with respect to a geographic location, area, time, carrying volume, occupancy density, specialized condition, or any other measurable characteristic of the transportation resource or its offering. For example, a component may be configured to generate a vehicular occupancy opportunity element/unit so that it identifies a quantity or amount of an offered resource (e.g., 10 miles of middle lane access along a highway) with respect a two or three dimensional area (e.g., one mile along one lane in the highway, 1,000 cubic meters of airspace, etc.). The two or three dimensional area may be defined via of a variety of grid, location, and geographic coordinate systems that are known in the art, such as the Cartesian coordinate system, a polar coordinate system, a cylindrical or spherical coordinate system, an Euclidean system, the Universal Transverse Mercator System (UTM), the Spatial Reference System (SRS), the Coordinate Reference System (CRS), etc. Select systems and methods for representing the transportation resource with respect to two and three dimensional areas are discussed in detail further below.

In an embodiment, a component may be configured to generate a vehicular occupancy opportunity element/unit that identifies a quantity or amount of an offered resource (e.g., 10 miles of airspace access) with respect to a three dimensional area. This vehicular occupancy opportunity element/unit may identify a geographic location (or point of origin) and coordinate values (e.g., X, Y, and Z) that represent the length, width, and height of an area in which the resource may be used by a lessee (i.e., the vehicle operator that purchases the vehicular occupancy opportunity element/unit or wins the resource auction). The vehicular occupancy opportunity element/unit may define the height of the three dimensional area based on altitude, such as relative to the mean sea level (MSL), the above ground level (AGL), or relative to a reference point that is above MSL or AGL (e.g., 100 meters above AGL). Vehicular occupancy opportunity (VOO) elements/units that define a resource with respect to a three dimensional area may referred to herein as "resource cubes," "vehicular occupancy opportunity element/unit cubes"

Some embodiments may include components configured to group or combine vehicular occupancy opportunity (VOO) elements/units to generate polygons or other geodetic groupings. The components may also submit these groupings for trade on the commodities exchange as a single unit. Resource cubes that are grouped into a polygon may be submitted to the commodities exchange system as a "resource grouping." Such groupings may be necessary or beneficial for covering transportation grid resource usage by oversized vehicles, tractor trailers, large boats, etc.

To focus the discussion on the relevant features, some of the embodiments are described using highway lanes, bridges, and local roadways as exemplary transportation resources. However, it should be understood that a vehicular occupancy opportunity element/unit may identify, define, quantify, pool, partition, organize, and/or package any transportation resource, and thus nothing in this application should be used to limit the scope of the claims to any individual transportation resource unless expressly recited as such in the claim language.

The various embodiments may be implemented within a variety of transportation infrastructure and communications systems, examples of which are illustrated in FIGS. 1A-1C, and FIGS. 16-17. With reference to FIG. 1A, mobile devices 102 integrated into or operatively coupled to a transportation vehicle may be configured to transmit and receive voice, data, and control signals to and from a base station 111, which may be a base transceiver station (BTS), NodeB, eNodeB, etc. The base station 111 may communicate with an access gateway 113, which may include one or more of a controller, a gateway, a serving gateway (SGW), a packet data network gateway (PGW), an evolved packet data gateway (ePDG), a packet data serving node (PDSN), a serving GPRS support node (SGSN), or any similar component or combinations of the features/functions provided thereof. Since these structures are well known and/or discussed in detail further below, certain details have been omitted from FIG. 1A in order to focus the descriptions on the most relevant features.

The access gateway 113 may be any logical and/or functional component that serves as the primary point of entry and exit of mobile device traffic and/or connects the mobile devices 102 to their immediate service provider and/or packet data networks (PDNs). The access gateway 113 may forward the voice, data, and control signals to other network components as user data packets, provide connectivity to external packet data networks, manage and store contexts (e.g. network internal routing information, etc.), and act as an anchor between different technologies (e.g., 3GPP and non-3GPP systems). The access gateway 113 may coordinate the transmission and reception of data to and from the Internet 105, as well as the transmission and reception of voice, data and control information to and from an external service network 104, the Internet 105, other base stations 111, and to mobile devices 102.

Each of the mobile devices 102 may include a global positioning system (GPS) receiver in communication with multiple geo-spatial positioning and navigation satellites 140 and any of the base station 111 of the communication network 104. The mobile device 102 may receive (e.g., via the GPS receiver) radio signals emitted by the satellites 140, measure the time required for the signals to reach the mobile device 102, and use trilateration techniques to determine the geographical coordinates (e.g., latitude and longitude coordinates) of the mobile device 102. The mobile device 102 may send the geographical coordinates to the communication network 104 at various times and/or in response to various conditions or events, such as upon initial acquisition with the communication network 104, in response to network-based requests, etc.

The various embodiments may supplement or substitute GPS-based location determination techniques with a mobile device centric approach to determining precise location based information. The DTRA may use mobile device 102 to mobile device 102 services in collecting information from multiple mobile devices 102, generating more precise location information on or about one or more mobile devices 102, generating advanced two-dimensional or three-dimensional location and position information on or about one or more mobile devices 102, and using the generated location/position information to provide mobile device the DTRA system with more accurate, more powerful, and more reliable location based services that may be used to track usage of transportation resources by lessees.

In various embodiments, the mobile device 102 may be configured to determine its geospatial location based on information collected from sensors in the mobile device (e.g. gyroscope, accelerometer, magnetometer, pressure sensor, etc.), information received from other mobile devices 102, and information received from network components in a communication system (e.g., GPS satellites, base stations, etc.). In an embodiment, the collection and reporting of sensor information may be controlled/performed by a sensor data module. For example, an application module may retrieve/receive sensor information from the sensor data module and send the sensor information to a position calculation module to compute the location of the mobile device locally for position updates and/or position augmentation. The application module may also send the computed location information to the system and or other mobile devices.

As mentioned above, in various embodiments, the mobile device 102 may be configured to determine its geospatial location based on information collected from other mobile devices. In these embodiments, two or more mobile devices may be organized into groups. Each mobile device 102 may also share its location information with the other mobile devices 102 with which the mobile device is grouped. For example, mobile devices 102 may be configured to share their current location and/or position information (e.g., latitude, longitude, altitude, velocity, etc.) and an estimate of a distance between themselves and a target mobile device with other mobile devices 102 in their group.

In an embodiment, the mobile device 102 may be configured to automatically share its location information with other mobile devices 102 upon discovery of the other mobile devices 102. Mobile devices 102 may augment their location information (e.g., position coordinates) with information received from other mobile devices 102 within same geographic location, and in a controlled pseudo ad-hoc environment. Since the shared location information (e.g., latitude, longitude, altitude, velocity, etc.) involves a relatively small amount of data, in an embodiment the mobile devices 102 may receive such information from a network server by in-band and or out-of-band signaling.

In various embodiments, the mobile devices 102 may be configured to enable transportation resource purchasing decisions, which may be relayed to a charging system 142 for settlement. Some embodiments may include a charging system that is integrated into the TRCE. Other embodiments may include a charging system including one or more third party financial institutions. TRCE purchases made at the mobile devices 102 may be relayed to the charging system 142 via the base stations 111 and access gateways 113.

In various embodiments, the base stations 111 and/or access gateway 113 may be coupled (e.g., via wired or wireless communication links) to a dynamic transportation resource arbitrage (DTRA) system configured to dynamically manage the availability, allocation, access, and use of various network resources (e.g., transportation grid resources, etc.). The DTRA system is discussed in detail further below.

Figure 1B:
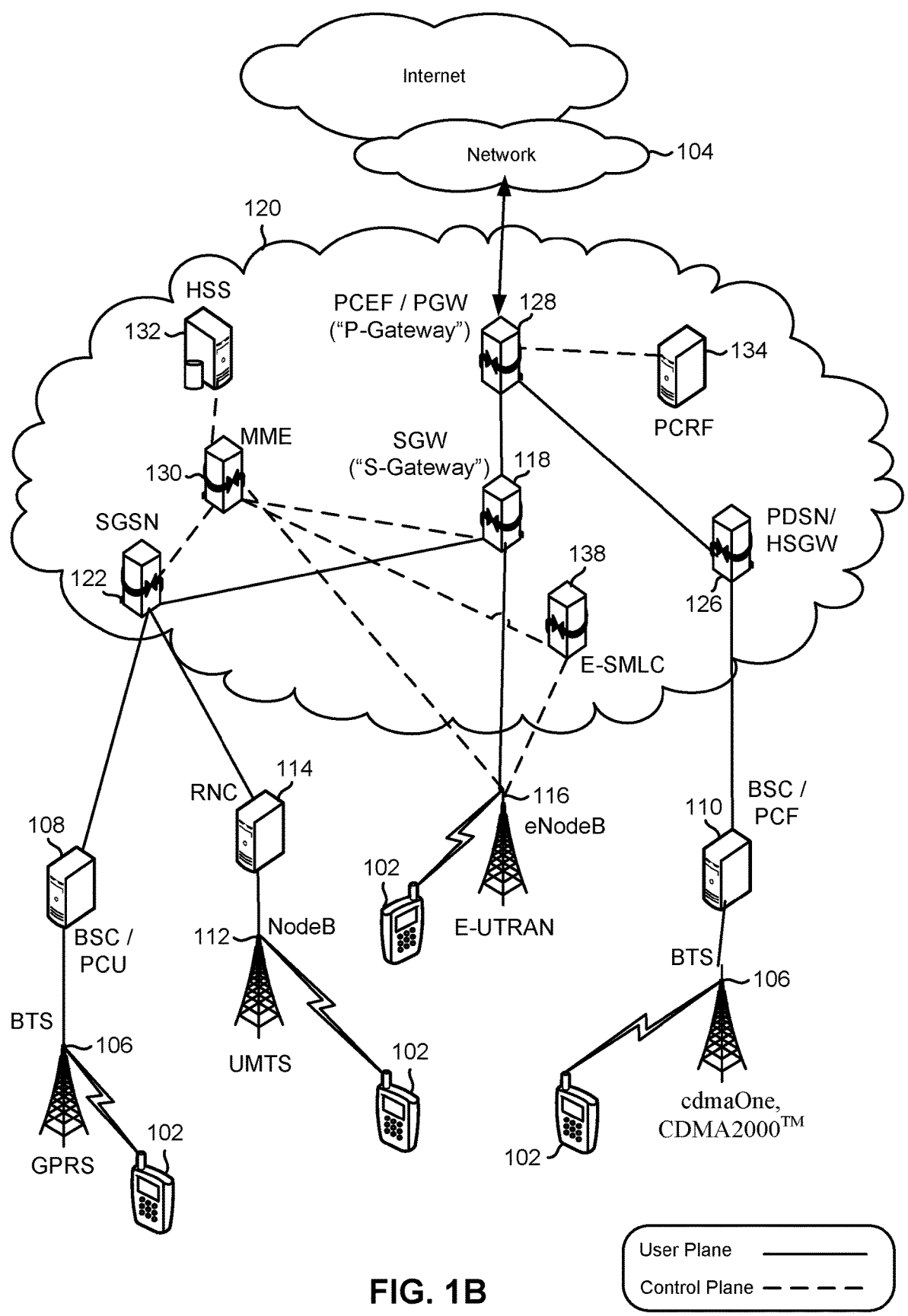

FIG. 1B illustrates that mobile devices 102 may be configured to send and receive voice, data and control signals to and from the service network 104 (and ultimately the Internet 105) using a variety of communication systems/technologies (e.g., GPRS, UMTS, LTE, cdmaOne, CDMA2000™), any or all of which may be supported by, or used to implement, the various embodiments.

In the example illustrated in FIG. 1B, long term evolution (LTE) and/or evolved universal terrestrial radio access network (E-UTRAN) data transmitted from a mobile device 102 is received by an eNodeB 116, and sent to a serving gateway (SGW) 118 located within the core network 120.

The eNodeB 116 may send signaling/control information (e.g., information pertaining to call setup, security, authentication, etc.) to a mobility management entity (MME) 130. The MME 130 may request user/subscription information from a home subscriber server (HSS) 132, communicate with other MME components, perform various administrative tasks (e.g., user authentication etc.), select a SGW 118, and send authorization and administrative information to the eNodeB 116 and/or SGW 118. Upon receiving the authorization information from the MME 130 (e.g., an authentication complete indication, an identifier of a selected SGW, etc.), the eNodeB 116 may send data received from the mobile device 102 to a selected SGW 118. The SGW 118 may store information about the received data (e.g., parameters of the IP bearer service, network internal routing information, etc.) and forward user data packets to a policy control enforcement function (PCEF) and/or packet data network gateway (PGW) 128.

FIG. 1B further illustrates that general packet radio service (GPRS) data transmitted from the mobile devices 102 may be received by a base transceiver station (BTS) 106 and sent to a base station controller (BSC) and/or packet control unit (PCU) component (BSC/PCU) 108. Code division multiple access (CDMA) data transmitted from a mobile device 102 may be received by a base transceiver station 106 and sent to a base station controller (BSC) and/or packet control function (PCF) component (BSC/PCF) 110. Universal mobile telecommunications system (UMTS) data transmitted from a wireless device 102 may be received by a NodeB 112 and sent to a radio network controller (RNC) 114.

The BSC/PCU 108, BSC/PCF 110, and RNC 114 components may process the GPRS, CDMA, and UMTS data, respectively, and send the processed data to a component within the core network 120. More specifically, the BSC/PCU 108 and RNC 114 units may send the processed data to a serving GPRS support node (SGSN) 122, and the BSC/PCF 110 may send the processed data to a packet data serving node (PDSN) and/or high rate packet data serving gateway (HSGW) component (PDSN/HSGW) 126. The PDSN/HSGW 126 may act as a connection point between the radio access network and the IP based PCEF/PGW 128. The SGSN 122 may be responsible for routing the data within a particular geographical service area, and send signaling (control plane) information (e.g., information pertaining to call setup, security, authentication, etc.) to an MME 130. The MME 130 may request user and subscription information from a home subscriber server (HSS) 132, perform various administrative tasks (e.g., user authentication, enforcement of roaming restrictions, etc.), select a SGW 118, and send administrative and/or authorization information to the SGSN 122.

The SGSN 122 may send the GPRS/UMTS data to a selected SGW 118 in response to receiving authorization information from the MME 130. The SGW 118 may store information about the data (e.g., parameters of the IP bearer service, network internal routing information, etc.) and forward user data packets to the PCEF/PGW 128. The PCEF/PGW 128 may send signaling information (control plane) to a policy control rules function (PCRF) 134. The PCRF 134 may access subscriber databases, create a set of policy rules and performs other specialized functions (e.g., interacts with online/offline charging systems, application functions, etc.). The PCRF 134 may then send the policy rules to the PCEF/PGW 128 for enforcement. The PCEF/PGW 128 may implement the policy rules to control the bandwidth, the quality of service (QoS), the characteristics of the data, and the services being communicated between the service network 104 and the end users.

In an embodiment, the network 104 may also include an Evolved Serving Mobile Location Center (E-SMLC) 138. Generally, the E-SMLC 138 collects and maintains tracking information about the mobile device 102. The E-SMLC may be configured to provide location services via a lightweight presentation protocol (LLP), which supports the provision of application services on top of TCP/IP networks. The E-SMLC 138 may send or receive (e.g., via LPP) almanac and/or assistance data to and from the MME 130 and/or eNB 116. The E-SMLC 138 may also forward external or network initiated location service requests to the MME 130.

In addition, the mobile device 102 may receive information from the serving eNodeB 116 via System Information Blocks that includes the neighbor cells to scan that are on the same system using the same frequencies or different frequencies, Home eNB (HeNB), in addition to CDMA, GERAN and UTRA cells.

In various embodiments, the E-SMLC 138 component configured to send and receive location information (e.g., latitude, longitude, altitude, velocity, etc.) to and from the mobile devices 102, which may be achieved both on-net and off-net. The location information may be delivered in standard formats, such as those for cell-based or geographical co-ordinates, together with the estimated errors (uncertainty) of the location, position, altitude, and velocity of a mobile device and, if available, the positioning method (or the list of the methods) used to obtain the position estimate To aid in the determination of the locations of mobile devices, some networks have standardized several reference signals. Various embodiments may use these reference signals for timing based location and positioning solutions. Such reference signals may include the primary and secondary synchronization signals and the cell specific reference signals In the various embodiments, any or all of the components discussed above (e.g., components 102-138) may be coupled to, or included in, a DTRA system configured to dynamically manage the availability, allocation, access, and use of transportation resources.

Figure 1C:
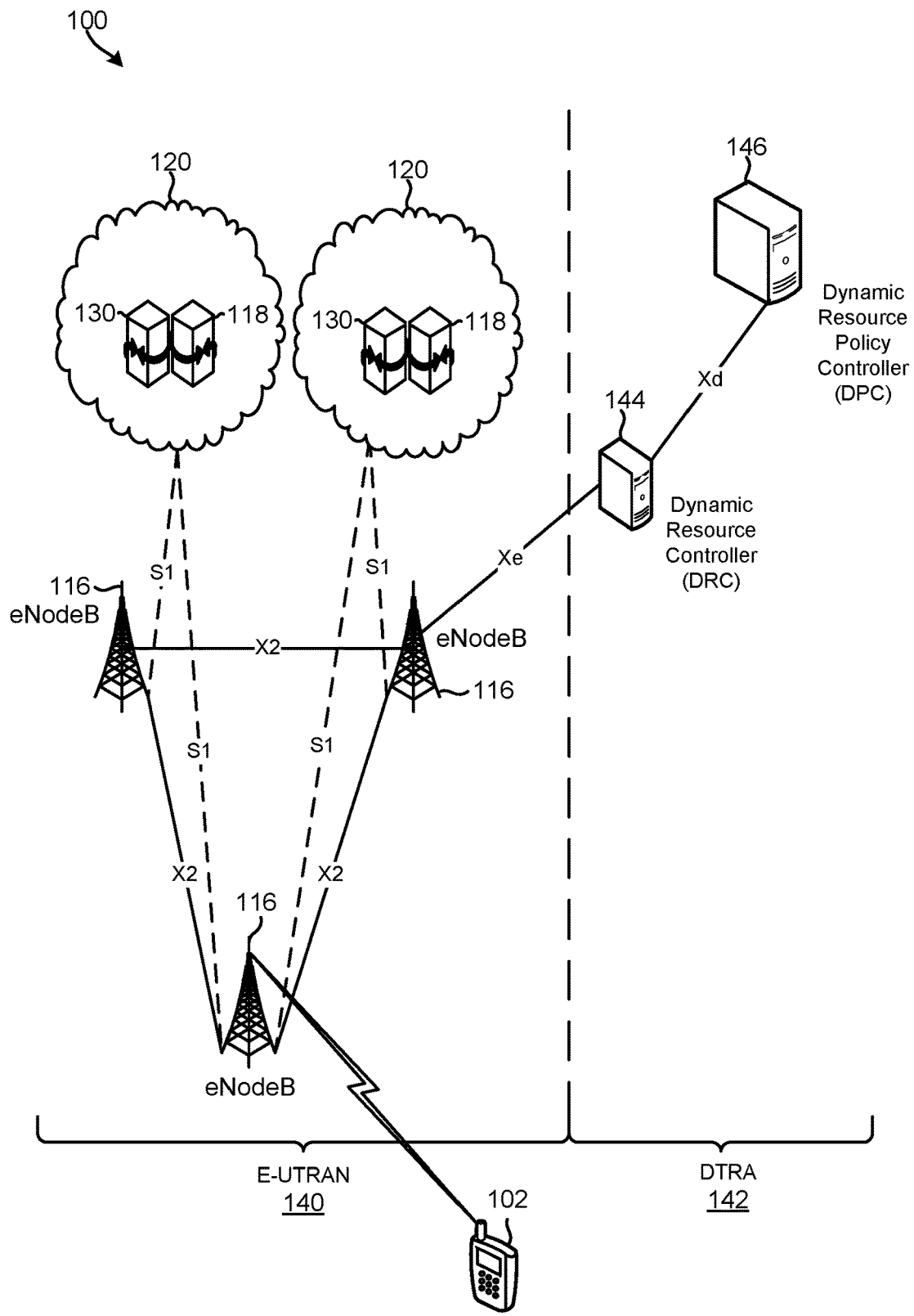
Figure 16:
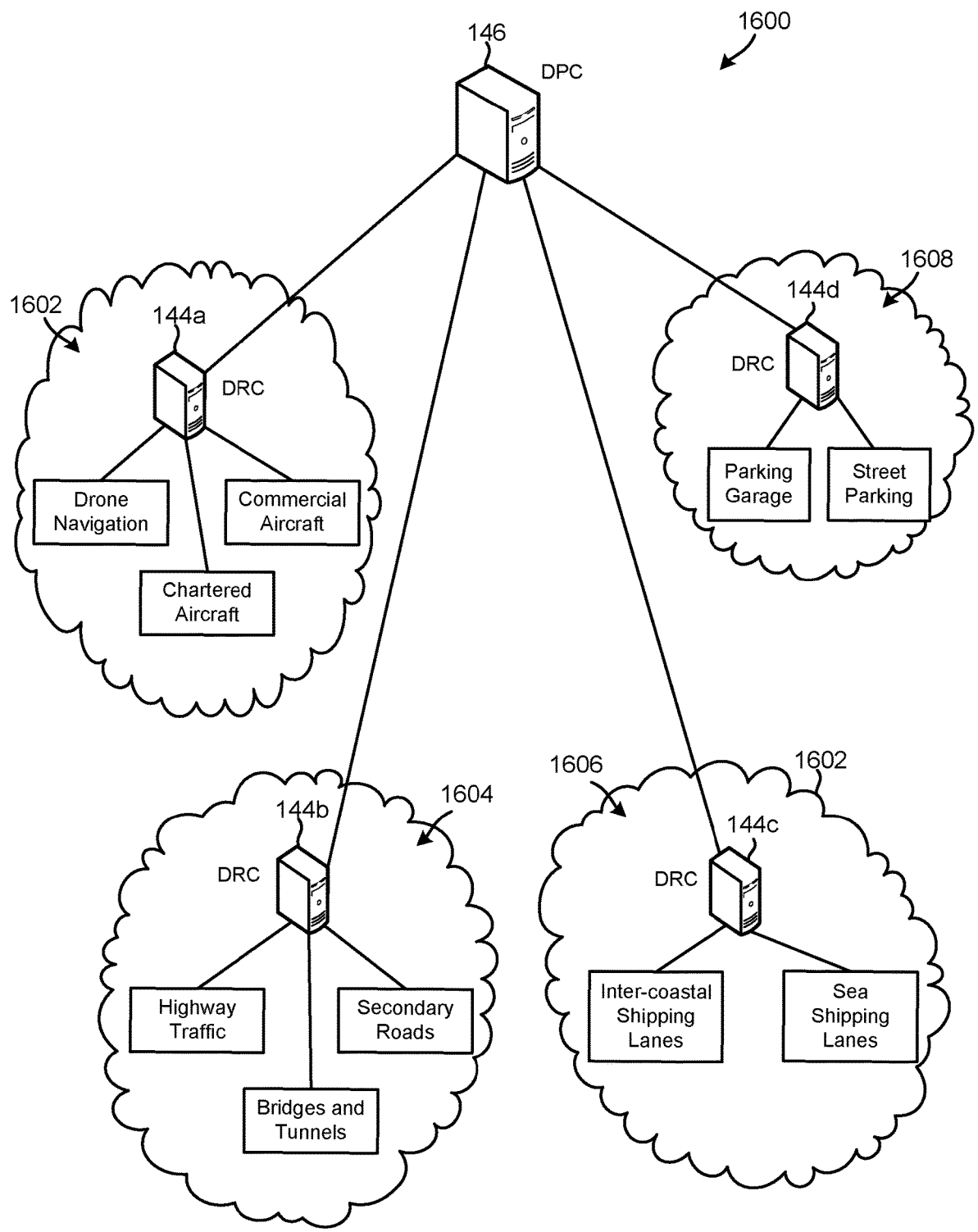
FIG. 16 is a block diagram illustrating components in an example system that is suitable for performing DTRA operations for allocating the rights for the access and use of a transportation resource that is associated with a vehicular occupancy opportunity element/unit or group of vehicular occupancy opportunity elements/units in accordance with an embodiment.
Figure 17:
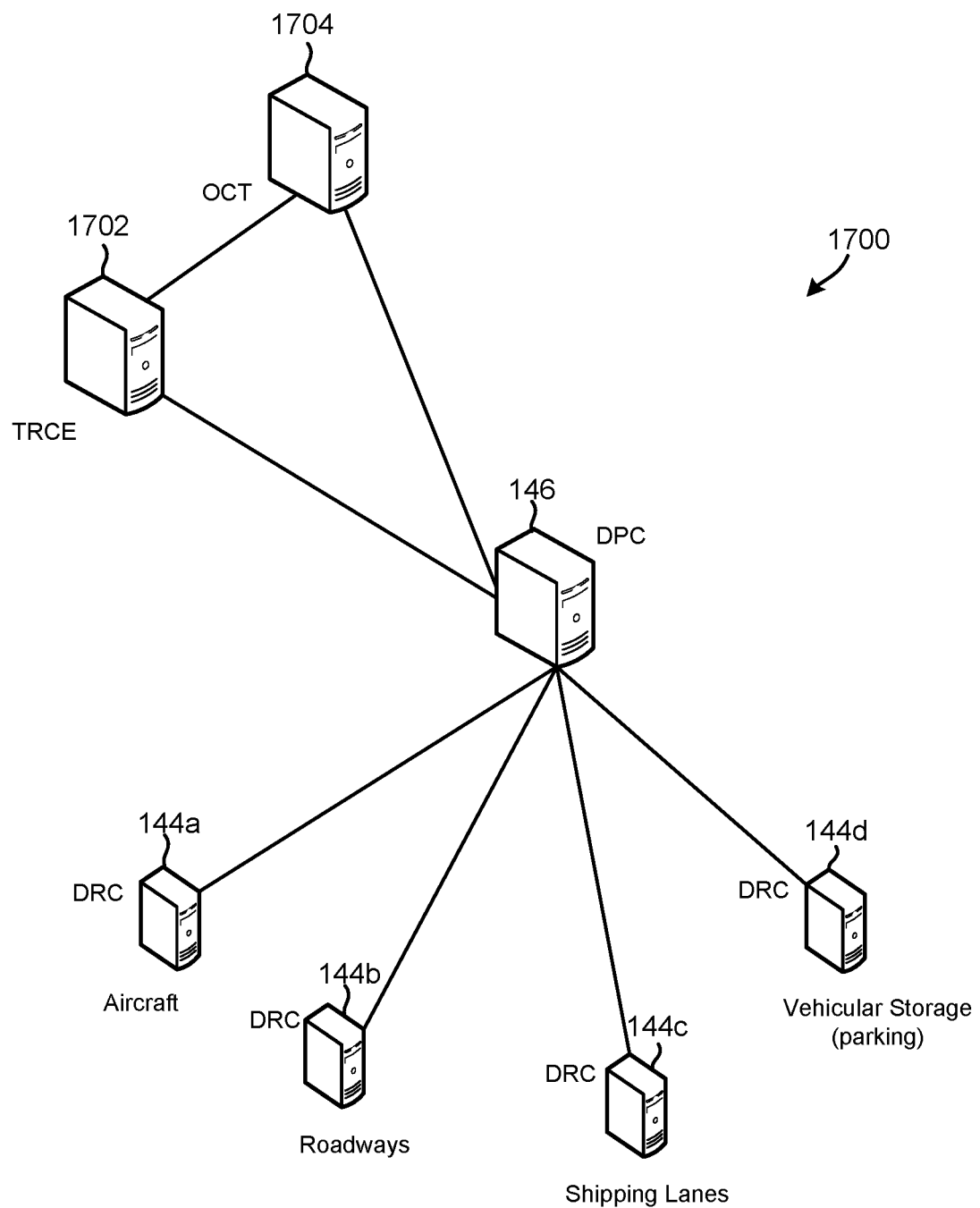
FIG. 17 is a block diagram illustrating components in another example system suitable for performing DTRA operations for allocating the rights for the access and use of a transportation resource that is associated with a vehicular occupancy opportunity element/unit or group of vehicular occupancy opportunity elements/units in accordance with another embodiment.

FIGS. 1C and 16-17 illustrate various logical components and communication links in an embodiment system 100 that includes a DTRA system 142 and an evolved universal terrestrial radio access network (E-UTRAN) 140. In the example illustrated in FIG. 1C, the DTRA system 142 includes a dynamic resource controller (DRC) 144 component and a dynamic transportation resources arbitrage (DTRA) policy controller (DPC) 146 component. The E-UTRAN 140 includes a plurality of interconnected eNodeBs 116 coupled to the core network 120 (e.g., via a connection to an MME, SGW, etc.).

In various embodiments, the DRC 144 may be included in or coupled to the E-UTRAN 140, either as part of its core network 120 or outside of the core network 120. In an embodiment, the DRC 144 may be coupled directly (e.g., via wired or wireless communication links) to one or more eNodeBs 116. In an embodiment, the DPC 146 may include communication links to a transportation resource commodity exchange (TRCE) component (not illustrated in FIG. 1C). In an embodiment, the DPC 146 may include a TRCE component.

The eNodeBs 116 may be configured to communicate with the DRC 144 via the Xe interface/reference point. The DRC 144 may be configured to communicate with the DPC 146 via the Xd interface/reference point. The eNodeBs 116 may be interconnected, and configured to communicate via an X2 interface/reference point. The eNodeBs 116 may be configured to communicate with components in the core network 120 via the S1 interface. For example, the eNodeBs 116 may be connected to an MME 130 via the S1-MME interface and to a SGW 118 via the S1-U interface. The S1 interface may support a many-to-many relation between the MMEs 130, SGWs 118, and eNodeBs 116. The eNodeBs 116 and MMEs 130 may further be configured to communicate with the E-SMLC to obtain location based information, and may pass such information to the DPC 146, DRC 144, or other network components. In embodiment, the DPC and/or DRC component may also be configured to communicate with a HSS 132 component. In an embodiment, the DPC and/or DRC may be configured to connect to the E-SMLC to obtain location information for one or more mobile devices 102.

The eNodeBs 116 may be configured to provide user plane (e.g., PDCP, RLC, MAC, PHY) and control plane (RRC) protocol terminations towards the wireless device 102. That is, the eNodeBs 116 may act as a bridge (e.g., layer 2 bridge) between the mobile devices 102 and the core network 120 by serving as the termination point of all radio protocols towards the mobile devices 102, and relaying voice (e.g., VoIP, etc.), data, and control signals to network components in the core network 120. The eNodeBs 116 may also be configured to perform various radio resource management operations, such as controlling the usage of radio interfaces, allocating resources based on requests, prioritizing and scheduling traffic according to various quality of service (QoS) requirements, monitoring the usage of network resources, etc. In addition, the eNodeBs 116 may be configured to collect radio signal level measurements, analyze the collected radio signal level measurements, and handover mobile devices 102 (or connections to the mobile devices) to another base station (e.g., a second eNodeB) based on the results of the analysis.

The DRC 144 and DPC 146 may be functional components configured to manage the dynamic transportation resource arbitrage process for sharing highway lane use and other transportation resources between different E-UTRANs 140. For example, the DPC 146 component may be configured to manage the DTRA operations and interactions between multiple E-UTRAN networks by communicating with DRCs 144 in the E-UTRAN network.

Figure 2:
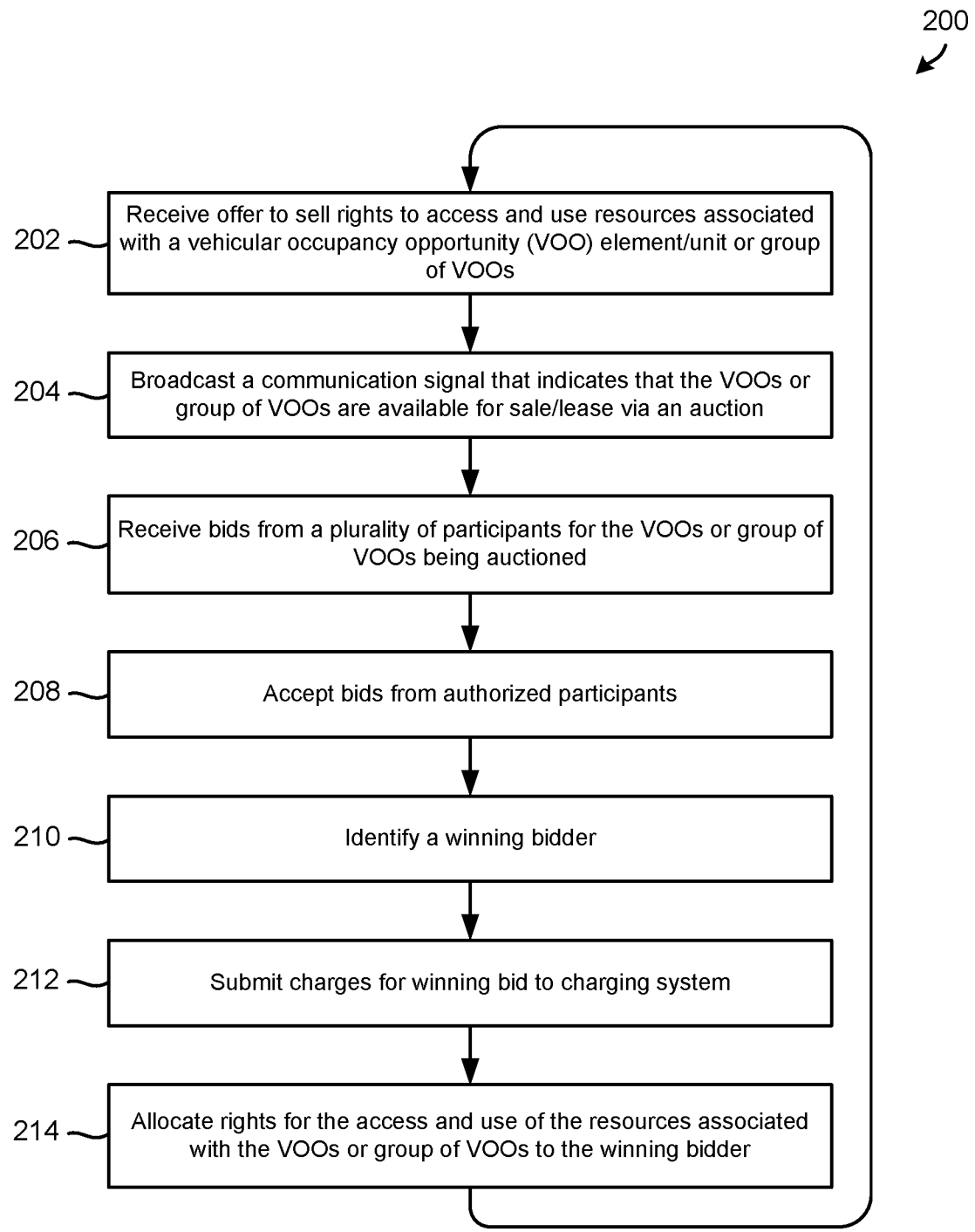
FIG. 2 is a process flow diagram illustrating a dynamic transportation resources arbitrage (DTRA) method of allocating the rights for the access and use of a transportation resource that is associated with a vehicular occupancy opportunity element/unit or group of vehicular occupancy opportunity elements/units in accordance with an embodiment.

FIG. 2 illustrates a DTRA method 200 of auctioning a vehicular occupancy opportunity element/unit or group of vehicular occupancy opportunity element/unit in accordance with an embodiment. The operations of DTRA method 200 may be performed by a processor or processing core in a DPC 146 component, in a TRCE component, or a combination thereof. In description below, DTRA method 200 may be performed by a processing core in a DPC 146 component, which may include a TRCE component.

In operation 202, the DPC 146 may receive offer for the sale of a vehicular occupancy opportunity element/unit (VOO) or group of VOOs, and an asking price for the offered VOO or group of VOOs. The offer for sale may be the offer of a license to utilize a transportation resource at a current or future time. For example, a lessor of a bridge, distance of highway along one lane, cubic area of airspace, or distance of waterway, may offer for sale on the transportation resource commodities exchange, a license to travel along the bridge, section of highway, airspace, or waterway at the time of purchase or on a subsequent date of travel. In some embodiments, a lessee may sub-lease their interest n the transportation resource to other travelers. For example, a commuter with a license to travel in the left hand lane of a highway between the hours of 8 am-10 am may decide to drive in a slower lane and offer his/her license up for temporary use by another motorist.

In operation 204, the DPC 146 may broadcast a communication signal that includes information suitable for informing a plurality of potential auction participants that the offered VOO or group of VOOs are available for sale and of the asking price for the VOO or group of VOOs. In some embodiments, the broadcast may be passed to mobile devices 102 of auction participants and may be displayed on a screen of the mobile devices. Embodiments including mobile terminals integrated into automobile dashboards may include receiving the broadcast and displaying information about the asking price for the license to use the transportation resource (e.g., a particular lane of the highway, bridge access, etc) as the user begins to access the resource or in advance of accessing the resource.

In operation 206, the DPC 146 may receive bids from a plurality of participants (e.g., vehicle operators, investors, etc.) for the VOO or group of VOOs. In some embodiments, bids may be made via mobile devices of the auction participants such as by selecting an on-screen feature on a touch screen display, or interacting with an on-screen feature via an input device. Further, some embodiments may enable users to increase and lower bids from a user interface. Other embodiments the DPC 146 may increase or lower bids by pre-determined amounts as bids are entered or withdrawn by users.

When a vehicle operator enters an area designated for bidding, the operator must make a bid, pay a predetermined flat fee, or leave the area. Vehicle operators who do not make a bid or pay a flat fee, may be notified that they have a set amount of time within which to pay for their use of the resource or penalties may result. Penalties for unauthorized resource access may include fines, levies, and or imposing of moving violations.

In operation 208, the DPC 146 may accept only the bids received from authorized participants determined to be eligible to participate in the auction. For example, as part of operation 206, the DPC 146 may determine whether the participants are registered brokers that are authorized to participate in the resource auction, and accept only the bids that are received from these authorized participants. The DPC 146 may further check for the presence of charging account information stored in association with broker registration information, to ensure that auction participants are able to settle transactions.

In operation 210, the DPC 146 may identify a winning bidder, such as by identifying the participant that submitted the last or highest bid for the current or future right to access and use resources associated with the VOO or group of VOOs. The number of winners may depend upon the nature of the transportation VOO or group being auctioned. For example, an auction for license to utilize a middle lane of a highway may have a rolling set of constantly updating winners as motorists enter and exit the section of highway for which the license is sought. Conversely, an auction for use of a cubic area of airspace may have only a single winner at the time to reduce the likelihood of aircraft collisions.

In operation 212, the DPC 146 may submit the amount of the winning bid to a charging system for settlement of the auction transaction. The charging system may be a component of the dynamic transportation resource arbitrage system or may be a third-party system such as a bank, a credit union, or other funds management entity. In various embodiments, the DPC 146 may attribute a winning bid to a specific broker, obtain charging system information for the broker account, and submit the amount of the winning bid to the identify charging system along with charging system account information. In some embodiments, the DPC 146 may wait for a confirmation of successful transaction from the charging system (e.g., funds are available in the pertinent account at the time of payment request submission), while in other embodiments, the DPC 146 may proceed to operation 214 without waiting for a charging system confirmation.

In operation 214, the DPC 146 may allocate the rights for the current or future access and use of the resources to the winning bidder. In an embodiment, this may accomplished by recording a transaction in a transaction database identifying the participant that submitted the winning bid as owning the VOOs and/or having exclusive or non-exclusive rights to the access and use of the resources associated with the VOOs at a current or future date or time.

Figure 3A:
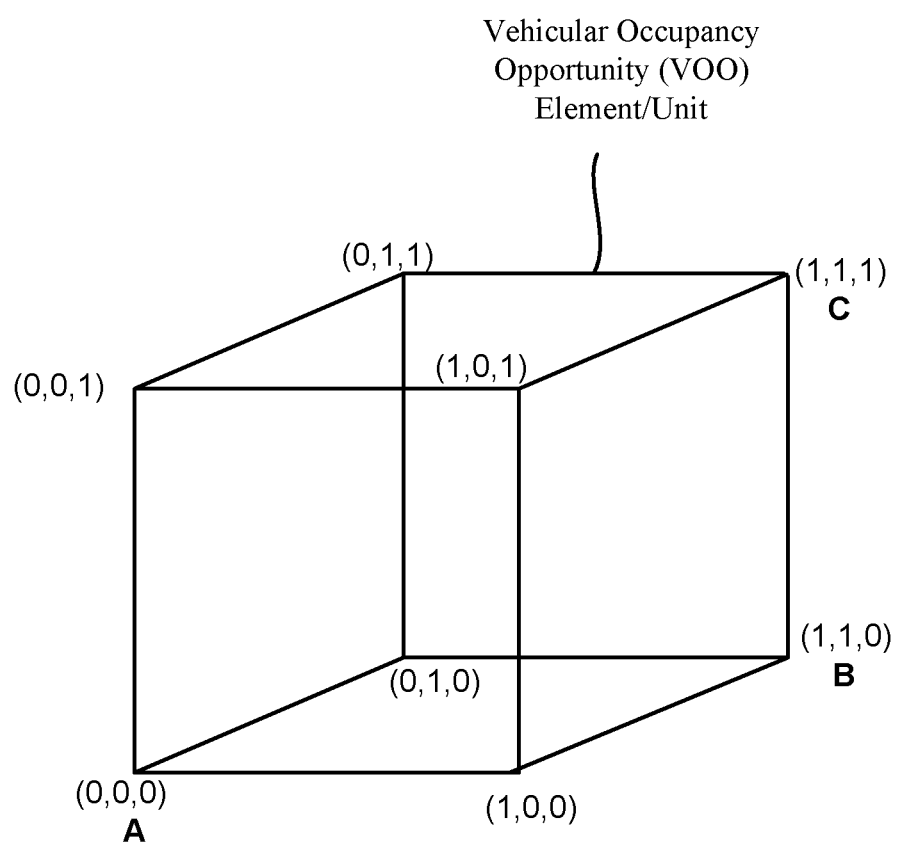

FIG. 3A is an illustration of an embodiment vehicular occupancy opportunity element/unit in the form of a vehicular occupancy opportunity element/unit (VOO) that defines an amount of transportation resource (e.g., 100 miles on Rte-1) in relation to a well-defined resource boundary (e.g., sides of the highway, lanes of the highway, flight path between two airports, etc.) in the form of a three dimensional cube. The cube may be defined based on two fundamental points $(X_1, Y_1, Z_1)$-$(X_2, Y_2, Z_2)$. The cube includes three dimensional points (A, B, and C), which defined at (0,0,0), (1,1,0), and (1,1,1), respectively.

The VOO may include information identifying various characteristics and/or properties of the transportation resource or the resource offering, such as the specific access way/roadway, the geographic area(s) in which the resource is offered for use, a resource availability time or date, a resource expiration time, a lease duration, lease start and stop times or dates, an entryway/exit way status, the service class of the resource or offering, etc.

FIG. 3B is an illustration of table that may be stored in association with a VOO to identify these characteristics or properties. The table illustrated in FIG. 3B lists the properties/characteristics as parameter-value pairs, and includes a description field that provides additional information for each parameter. The parameters may be different for different types of transportation resources.

Figure 4:
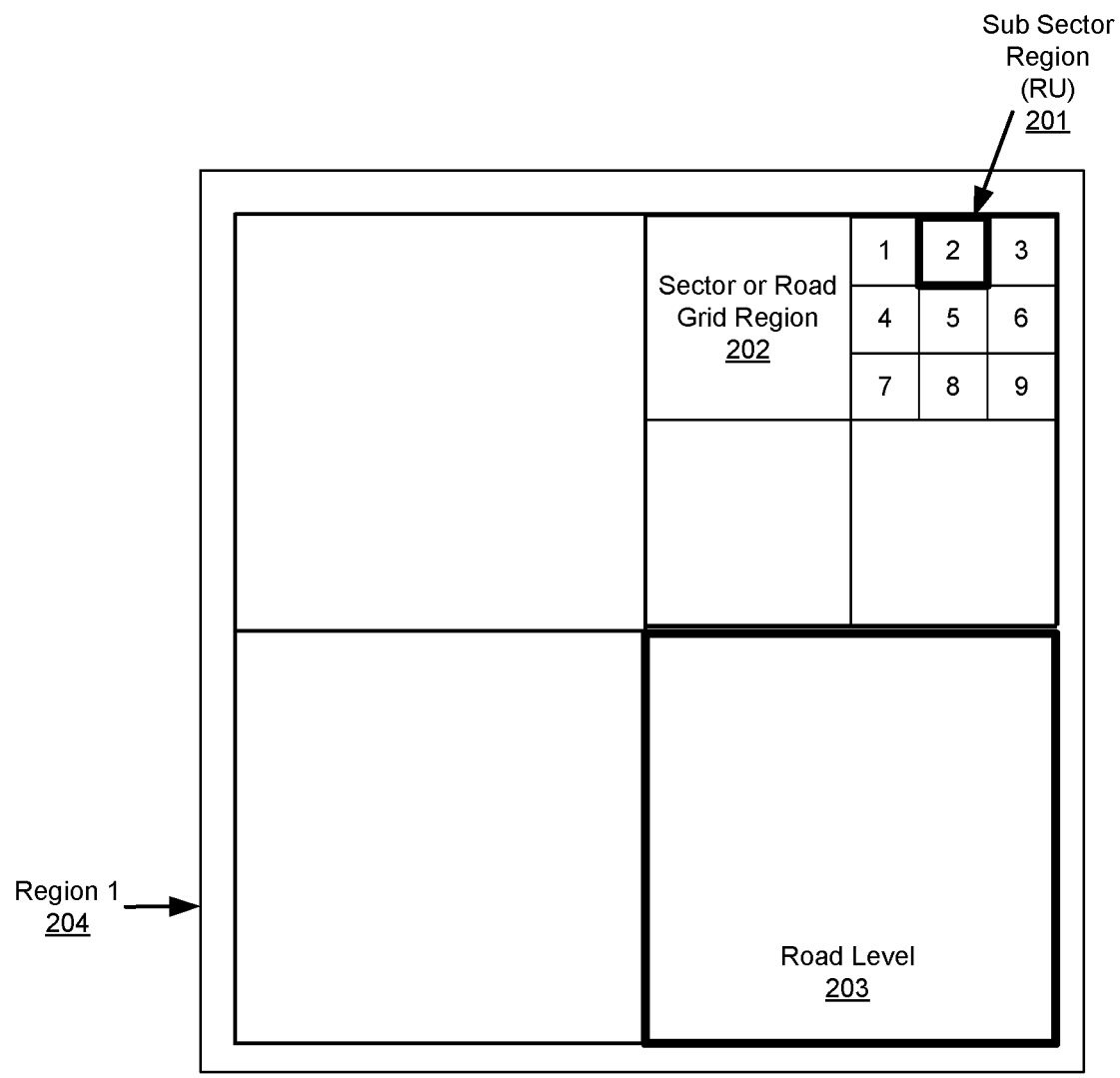

FIGS. 4 and 15 are illustrations of various geographical boundaries associated with a transportation resource that may be represented by one or more vehicular occupancy opportunity elements/units in accordance with the various embodiments. Specifically, FIG. 4 illustrates that the geographical boundaries of a resource may be represented via single VOO (201) or multiple VOOs that define a sector of road (202), a whole highway (203), or which represent multiple lanes (204).

Each VOO cube may represent the most granular geospatial area of commoditized transportation resource. Each VOO cube may include, identify or represent an X amount of a transportation resource (e.g., distance of roadway). VOO cubes may be aggregated into larger cubes or forms within polygons or groups of polygons, and used as a multi-dimensional artillery grid by which those seeking resources may identify and select target areas, and as necessary, adjust onto their specific optimum target area.

Figure 5A:
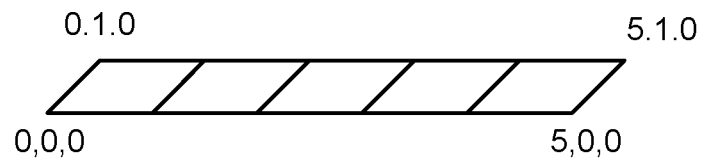
Figure 5B:
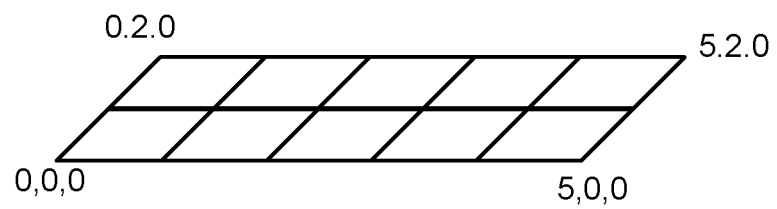
Figure 5C:
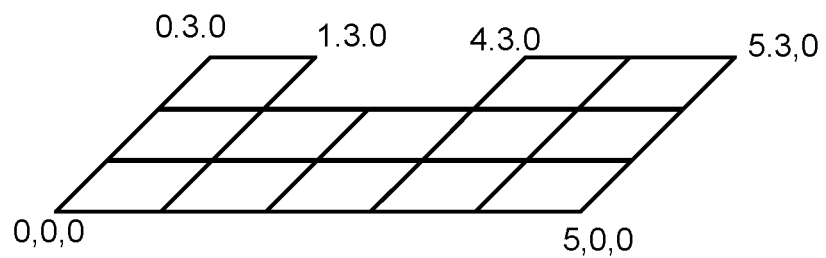

FIGS. 5A and 5B illustrate that vehicular occupancy opportunity elements/units may be combined to define polygons that cover different geographical areas. FIG. 5C illustrates that vehicular occupancy opportunity element/unites may combined or arranged so as to form an irregular shape. This flexibility provides participants with fine grain controls over the resources they offer, lease or purchase. Such fine grain controls allow lessee travelers to purchase or lease only the resources they require or are likely to use. These fine grain controls also allow lessors to more narrowly slice their available resources so that they may be leased to more consumers or so that they may be priced more competitively.

Figure 6A:
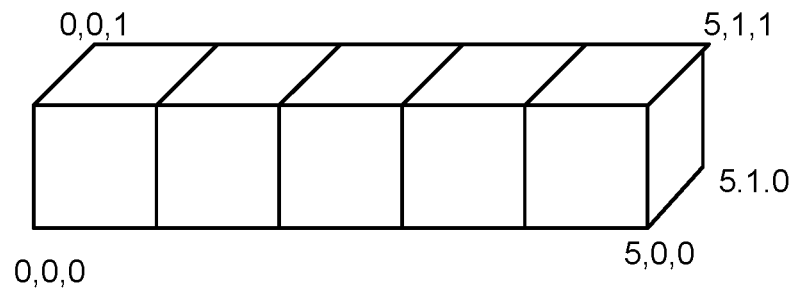
Figure 6B:
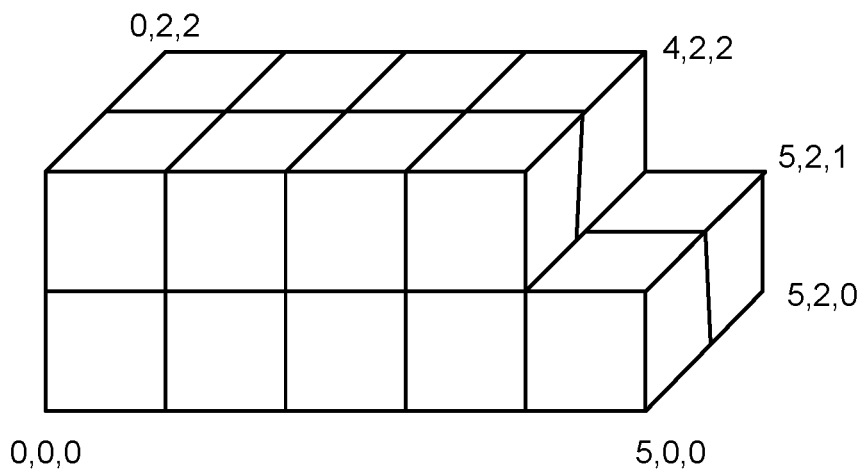

FIGS. 6A and 6B illustrate that resource cubes (i.e., vehicular occupancy opportunity elements/units that include a Z, height, or altitude component) may be combined or grouped to define polygons that cover different geographical areas. The Z, height, or altitude component of the resource cubes may be defined in relation to the mean sea level (MSL) or the above ground level (AGL). For example, altitude component may be defined relative to 100 meters above the mean sea level.

FIG. 6C is an illustration of table that may be stored in association with a VOO grouping that defines polygon to identify various properties of the grouping or the VOOs that are included in the group. The table illustrated in FIG. 6C lists the properties as parameter-value pairs, and includes a description field that provides additional information for each parameter. The parameters include a polygon ID, number of VOOs included in the grouping, number of VOOs that define an area in terms of length and width, and number of VOOs that include a value for the Z, height, or altitude component of the area. In the example illustrated in FIG. 6C, the VOO grouping has a Polygon ID of "16" and includes 1000 VOOs. All the included VOOs define an area in terms of length and width, and none of the included VOOs include Z, height, or altitude component. That is, all of the included VOOs are associated with two-dimensional resource boundaries.

Figure 7A:
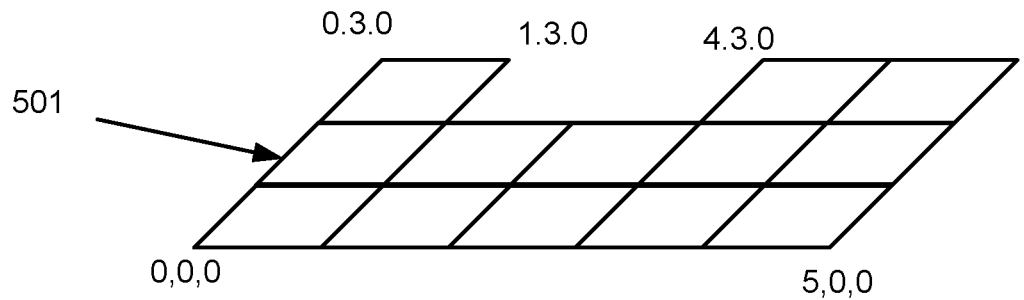
Figure 7B:
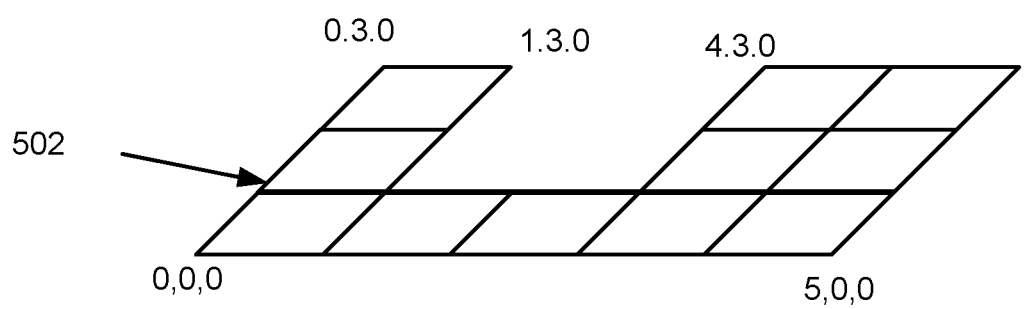
Figure 7C:
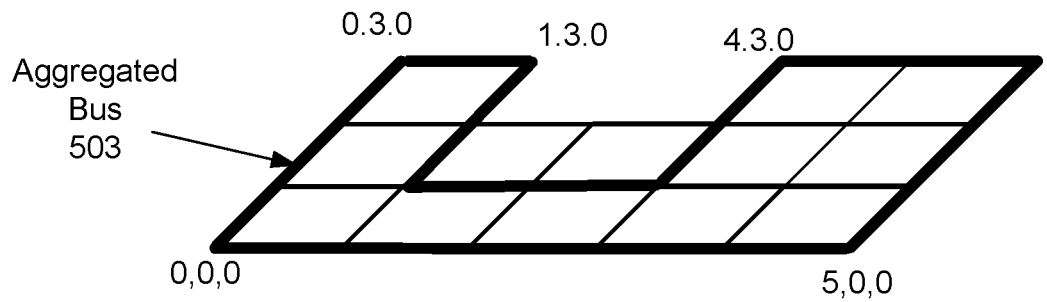

FIGS. 7A and 7B are illustrations of different vehicular occupancy opportunity element/unit groupings that share common geodetic reference points in accordance with an embodiment. FIG. 7C illustrates that the vehicular occupancy opportunity element/unit groupings illustrated in FIGS. 7A and 7B may be aggregated to increase the availability of the transportation resource. This aggregation may be accomplished by utilizing a transportation resource allocation scheme, and may include overlapping polygons and aggregating vehicular occupancy opportunity elements/units that have different alignments (e.g., lanes of a highway), distance allocations, or service classes.

Figure 8A:
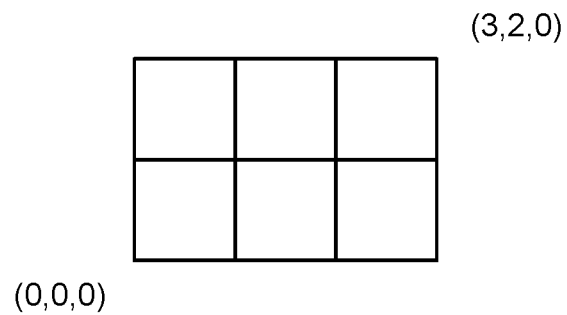
Figure 8B:
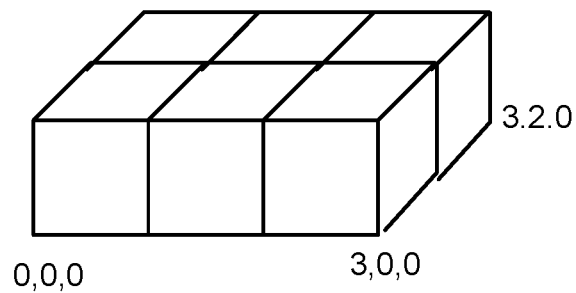
Figure 8C:
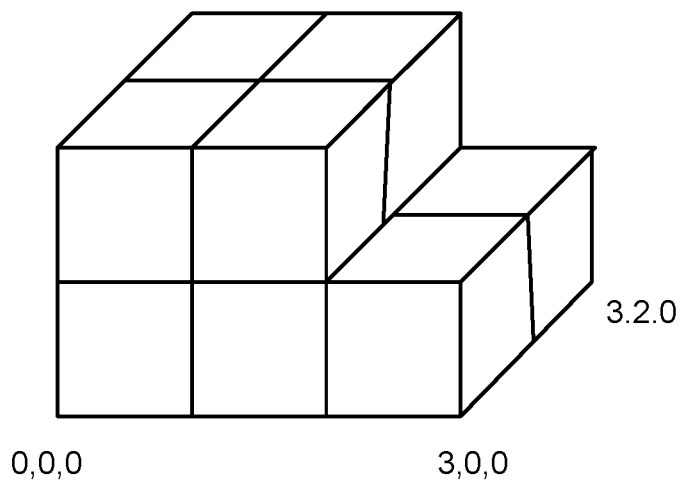

FIGS. 8A through 8C are illustrations of different vehicular occupancy opportunity element/unit groupings in accordance with an embodiment. Specifically, FIG. 8A illustrates a vehicular occupancy opportunity element/unit grouping in the form of a primary polygon that is defined with a representative number of vehicular occupancy opportunity elements/units. FIGS. 8B and 8C illustrates resource cube groupings corresponding to the primary polygon illustrated in FIG. 8A and which form a polygon having a Z, height, or altitude component.

Figure 9A:
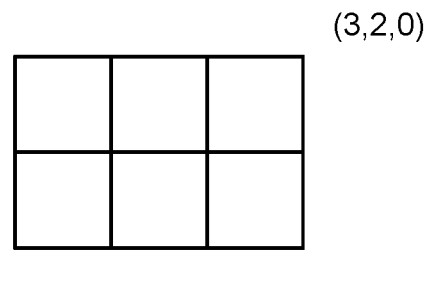
Figure 9B:
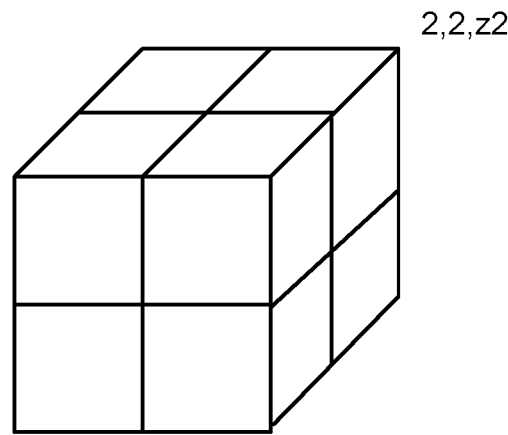
Figure 9C:
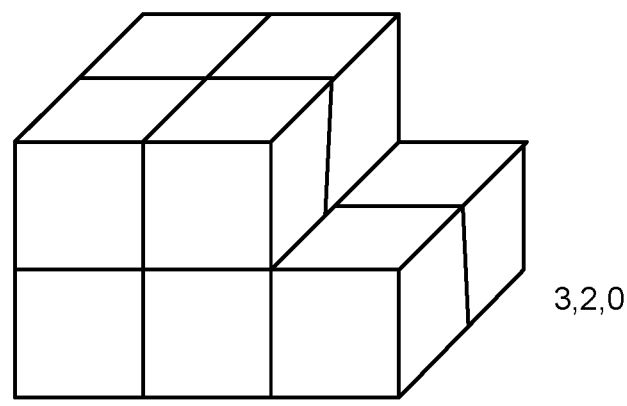

FIGS. 9A through 9C are illustrations of different vehicular occupancy opportunity element/unit groupings in accordance with another embodiment. FIG. 9A illustrates a vehicular occupancy opportunity element/unit grouping in the form of a primary polygon that is defined with a representative number of vehicular occupancy opportunity elements/units. FIGS. 9B and 9C illustrates resource cube groupings corresponding to the primary polygon illustrated in FIG. 9A and which form a polygon having a Z, height, or altitude component. FIGS. 9B and 9C also illustrate that the resource cube groups do not have to be contiguous in any direction, and may include a height, length or width variance or gag between the vehicular occupancy opportunity elements/units.

Figure 10:
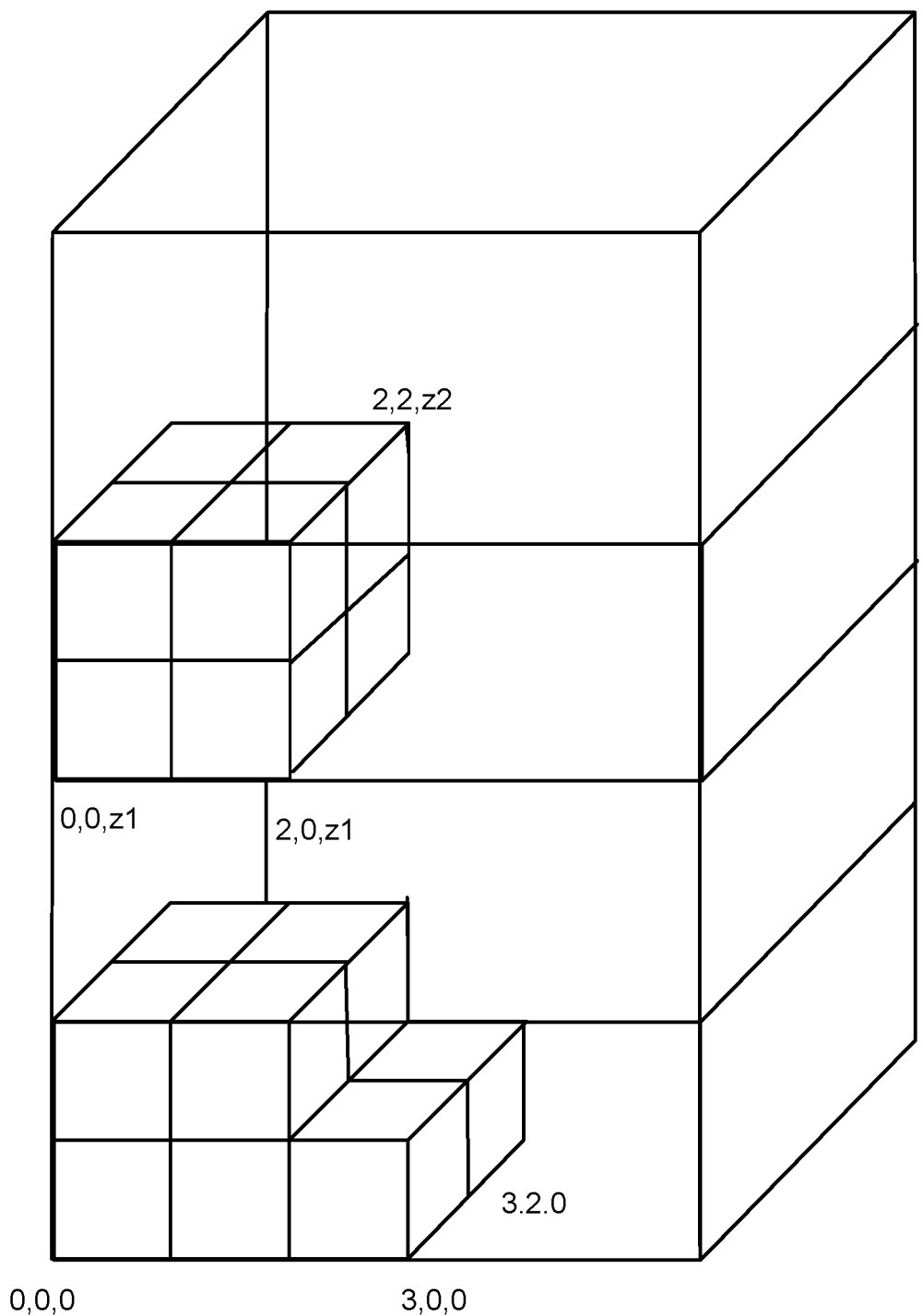

FIG. 10 is an illustration that shows the resource cubes being associated with altitude ceilings in airspace in accordance with an embodiment. That is, different ceilings of the airspace are designated with different resource cube combinations or grouping. The two cube clusters/grouping illustrated in FIG. 10 do not have to be coupled, and it is possible that the particular attributes associated with the different resource cube groupings share a common polygon but have different attributes leading to different transportation resource allocations based on the number of resource cubes and their relative position in terms of altitude, Z, to the primary polygon (e.g., the polygon illustrated in FIG. 9A).

Alternatively, the resource cubes may be grouped to cover parking spaces within a multi-level parking deck having an altitude Z. Each level of the parking deck may have a similar number of resource cubes available for lease and pricing of vehicular occupancy opportunity elements/units may differ by level of the parking garage.

Figure 11:
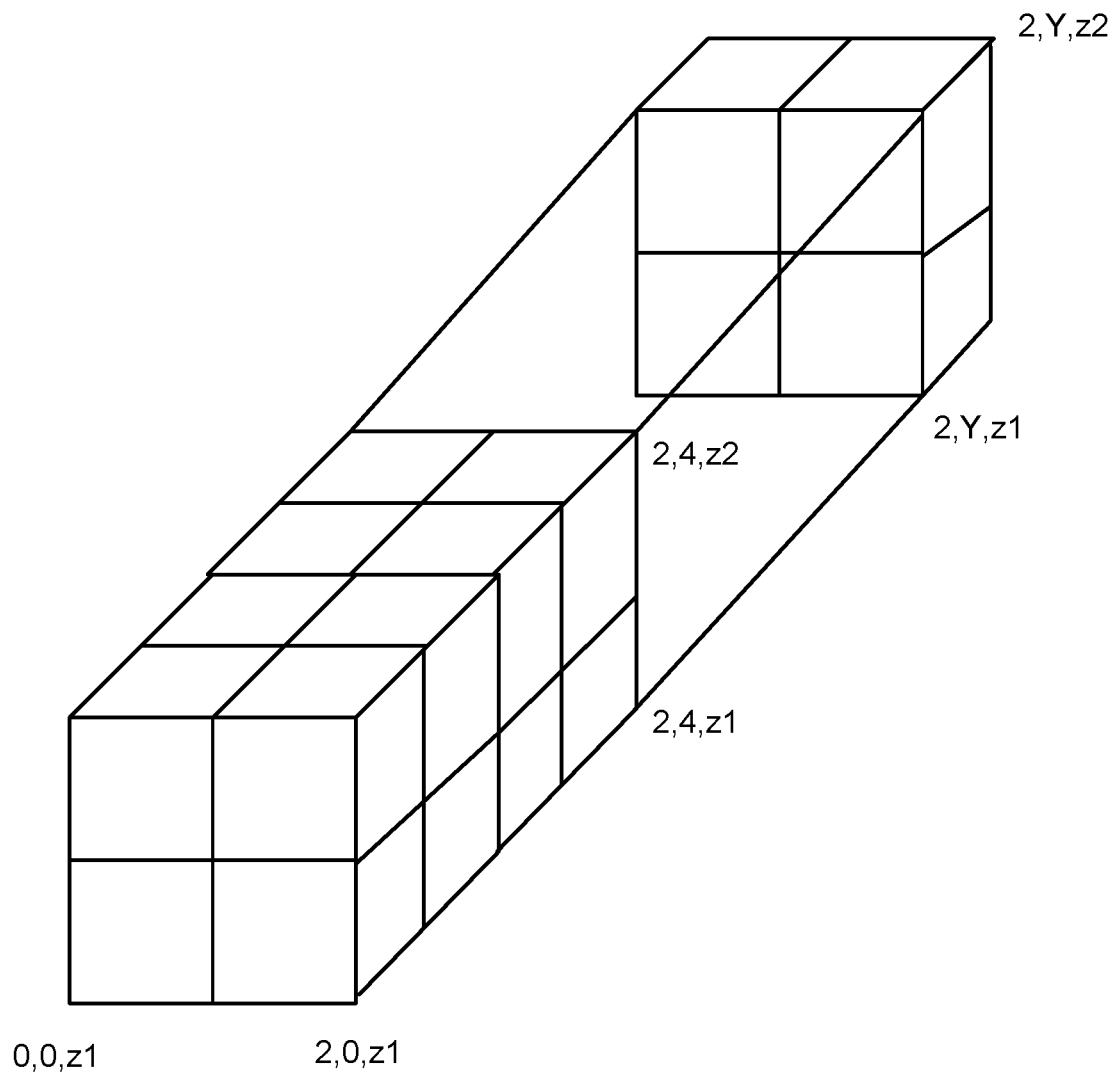

FIG. 11 illustrates that the resource cubes may be grouped to cover waterways, tunnels, corridors and other similarly narrow areas. Specifically, FIG. 11 illustrates a resource group/cluster that includes resource cubes that include an altitude and which extend for a distance Y.

Figure 12:
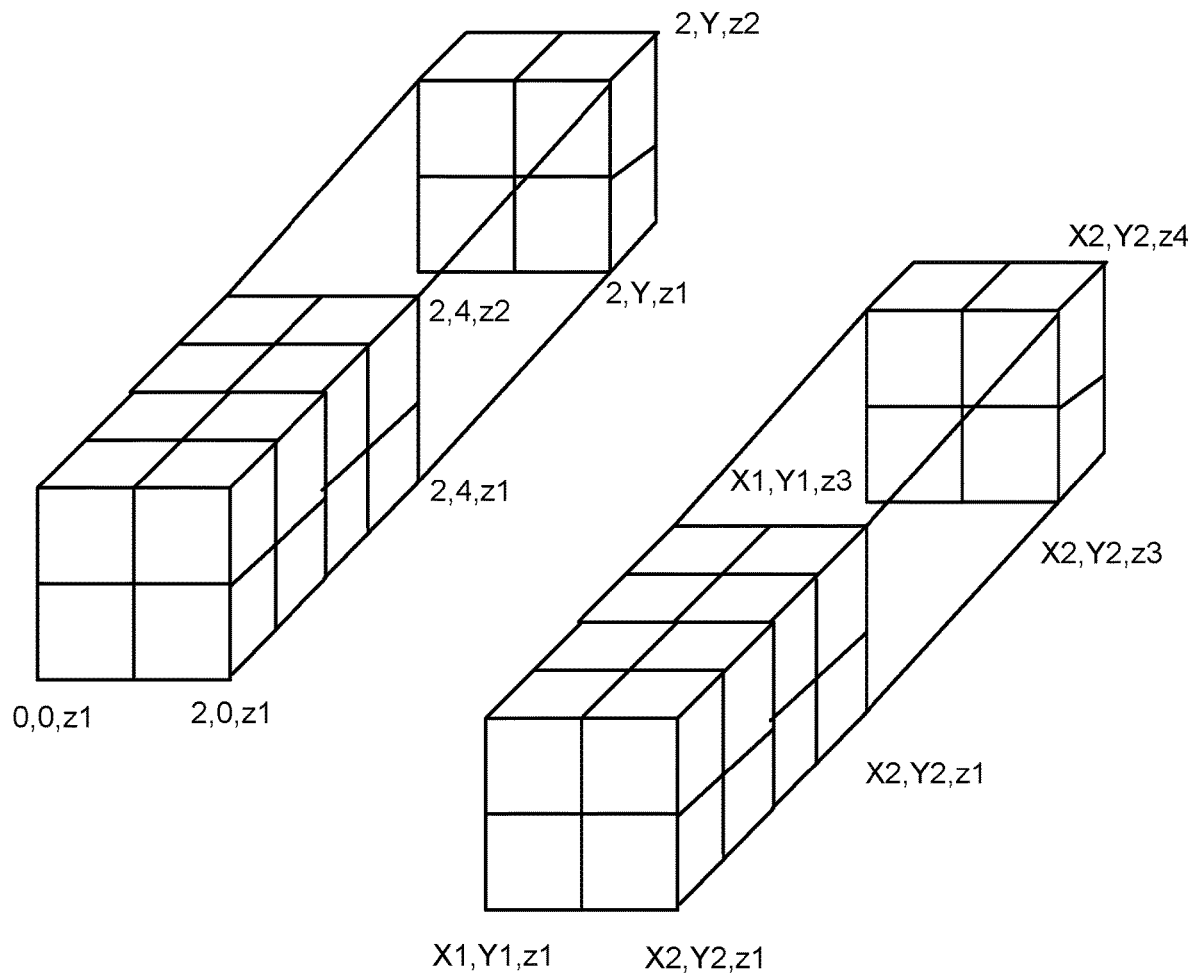

FIG. 12 illustrates that the resource cubes may be grouped to cover lanes in a highway, bridges and other similar areas. Such a corridor cluster could cover the licensing of highway lanes to travelers, such as the George Washington Bridge during peak hours of usage. That is, at certain times of the day, some segments of the transportation grid come into an over abundance of motorist traffic from commuters going in and out of New York City. Commuters interested in travelling across this zone may want to bid on the exact lane they wish to utilize during their commute. Using certain grid allocation techniques, the various embodiments may allow for bidding on resources for the inbound upper and lower deck of the bridge for morning rush hour and then only looking for resources for the outbound lower deck for the bridge during the evening rush hour.

With the resource cubes the need for a common geodetic reference is needed to not only facilitate the potential bidder's ability to determine the viability of an offered polygon but also enable corridor clusters as well as use of transportation resources in multiple tiers of elevation. There are multiple ways of dissecting the planet Earth into grids for determining locations, and some are more useful and accurate than others. Using the latitude and longitude coordinate system for defining some of the resource cube dimensions would be a mistake differing sizes that the resource cube may have as latitude changes due the earth's curvature.

One method that would work best however is a system called The Universal Transverse Mercator System, better known as "UTM." There are other coordinate systems like the National Coordinate Systems including Spatial Reference Systems (SRS) or the Coordinate Reference System (CRS) that can be used as well. However for this example UTM will be used.

The UTM system divides the earth into 60 separate zones of six degrees of longitude each. Also, the earth is separated and labeled A to Z, in respect to latitude. The latitude division of the earth gives each section eight degrees of width, with a few exceptions. Letters I and O are not used to avoid confusion as they are written similarly to numbers. Sections A and B take up the southern eighty degrees of the globe, and Y and Z take up the northern eighty four degrees, so these sections cover the poles, the areas that make the latitude and longitude system nearly unusable, creating an amount of distortion that would only be detrimental to defining a VOO cube. In addition, zone X in the UTM system encompasses twelve degrees of latitude rather than the standard eight thereby making it's a better coordinate system to utilize.

With this system of creating exact, and useful grids of the planet earth, creating a location of an exact point on a two dimensional field becomes quite simple. If you are aware of which grid you are located in, you can use X and Y coordinates to determine how far in the X direction and the Y direction a certain location is in relation to the grid that you have picked. So going back to the George Washington Bridge, you can use UTM to determine the exact location of the bridge, or truly, the exact area desired for travel. Using UTM, you can determine the beginning and end X and Y coordinates, and get as accurate and precise measurement as desired.

Using UTM, the earth is already divided into equal sized areas, with a handful of anomalous spots as you approach the northern and southern poles. This means we can create a standard unit of measure of space, and determine its exact location by using UTM coordinates. For example, let's say we were to create a standard unit of a square meter. For the George Washington Bridge, if you had the coordinates for the start and end of the bridge, you can divide the determined area into square meter blocks, and auction off those in groups or individually, depending on who is leasing the resources.

We can make how we divide resources even more granular however, and more effective and useful. There are two levels to the George Washington Bridge, and a traveler may only be interested in covering the upper level. The UTM grid system would work perfectly for helping determine our X and Y coordinates. However UTM does not have a Z coordinate. Therefore Z coordinate can be referenced to many points. The most common reference point is relative to sea level, average mean above sea level (AMSL). Determining the Z coordinates in relation to sea level gives a universal point of "Zero" for the Z axis. Being able to use the Z axis in determining coverage areas can help determine more exact prices of coverage for certain areas, such as levels of airspace and depths of waterways. Access to certain heights of the airspace may be worth more to certain people than others, and having the ability to choose the height of a unit of coverage makes that possible.

By adding in our third directional coordinates, we can modify our use of a basic unit of coverage from being a square meter to a meter cubed leading to the VOO cube. Therefore being able to divide the George Washington Bridge, or any other trafficked area, into a definitive amount of purchasable coverage blocks can help unify the way VOOs can be will be used and defined both within any market But also globally.

The various embodiments include dynamic transportation resource arbitrage (DTRA) methods and components configured to implement the DTRA methods. A DTRA method may include generating granular vehicular occupancy opportunity elements/units that each identify an amount of a transportation resource that is offered for allocation and use by other travelers with respect to an area or volume, and offering the vehicular occupancy opportunity elements/units for purchase, lease, or trade on a commodities exchange.

In an embodiment, generating the granular vehicular occupancy opportunity elements/units may include generating vehicular occupancy opportunity elements/units that use a universal standard to identify, quantify, measure, and/or represent the transportation resource. In an embodiment, generating the granular vehicular occupancy opportunity elements/units may include generating vehicular occupancy opportunity elements/units that identify the transportation resource in a standard format, structure, or unit that is readily understood by the trading community. In an embodiment, generating the granular vehicular occupancy opportunity elements/units may include generating vehicular occupancy opportunity elements/units that include or provide a common reference point against which other vehicular occupancy opportunity elements/units and transportation resources may be compared. In an embodiment, generating the granular vehicular occupancy opportunity elements/units may include generating vehicular occupancy opportunity elements/units that define a distance of road along a particular lane in relation to a geographic area encompassing one cubic meter. In an embodiment, generating the granular vehicular occupancy opportunity elements/units may include generating vehicular occupancy opportunity elements/units that may be combined to cover a precise location or area.

In an embodiment, the DTRA method may include comparing two or more vehicular occupancy opportunity elements/units that represent different resource offerings from different lessors to determine the relative economic value of the offered amounts of transportation resource. In an embodiment, the DTRA method may include combining the vehicular occupancy opportunity elements/units to cover an area that encompasses a highway, bridge, navigation path, waterway, air traffic corridor, and/or any other similar area. In an embodiment, the vehicular occupancy opportunity elements/units may be resource cubes that include an altitude dimension. In an embodiment, offering the vehicular occupancy opportunity elements/units for purchase, lease, or trade on a commodities exchange may include grouping the vehicular occupancy opportunity elements/units to form a polygon and offering the group of vehicular occupancy opportunity elements/units for purchase, lease, or trade on the commodities exchange.

Further embodiments may include a server computing device having a multi-core processor that includes two or more processor cores, one or more of which is configured with processor-executable instructions to perform operations of the DTRA methods described above. Further embodiments may include a server computing device having various means for performing functions of the operations of the DTRA methods described above. Further embodiments may include non-transitory processor-readable storage medium having stored thereon processor-executable instructions to cause a processor to perform operations of the DTRA methods described above.

Figure 13:
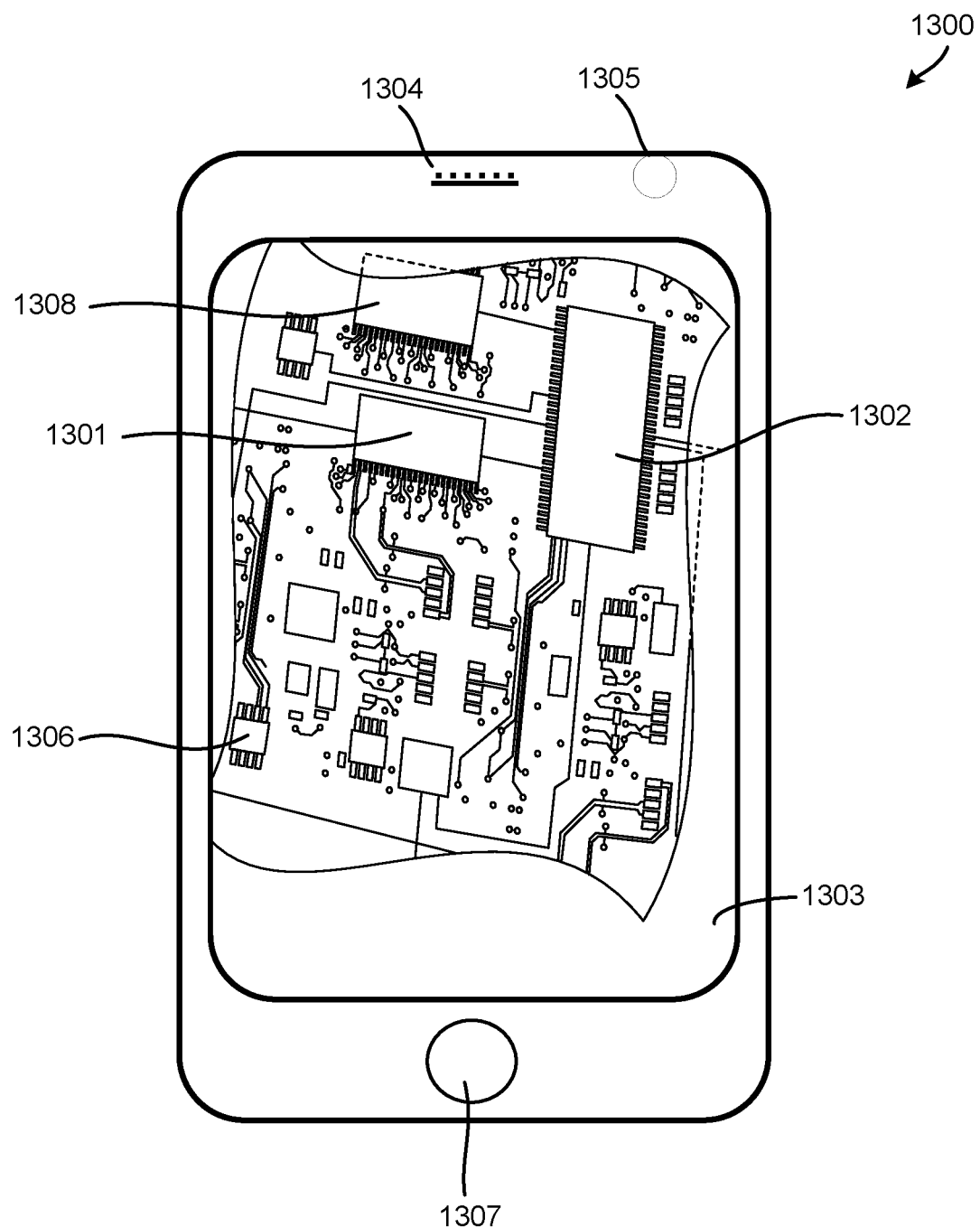
FIG. 13 is a component block diagram of an example wireless device suitable for use with the various embodiments.

Various embodiments may be implemented on a variety of mobile wireless computing devices, an example of which is illustrated in FIG. 13. Specifically, FIG. 13 is a system block diagram of a mobile transceiver device in the form of a smartphone/cell phone 1300 suitable for use with any of the embodiments. The cell phone 1300 may include a processor 1301 coupled to internal memory 1302, a display 1303, and to a speaker 1304. Additionally, the cell phone 1300 may include an antenna 1305 for sending and receiving electromagnetic radiation that may be connected to a wireless data link and/or cellular telephone transceiver 1306 coupled to the processor 1301. Cell phones 1300 typically also include menu selection buttons or rocker switches 1307 for receiving user inputs.

A typical cell phone 1300 also includes a sound encoding/decoding (CODEC) circuit 1308 which digitizes sound received from a microphone into data packets suitable for wireless transmission and decodes received sound data packets to generate analog signals that are provided to the speaker 1304 to generate sound. Also, one or more of the processor 1301, wireless transceiver 1306 and CODEC 1308 may include a digital signal processor (DSP) circuit (not shown separately). The cell phone 1300 may further include a ZigBee transceiver (i.e., an IEEE 802.15.4 transceiver) for low-power short-range communications between wireless devices, or other similar communication circuitry (e.g., circuitry implementing the Bluetooth® or WiFi protocols, etc.).

Figure 14:
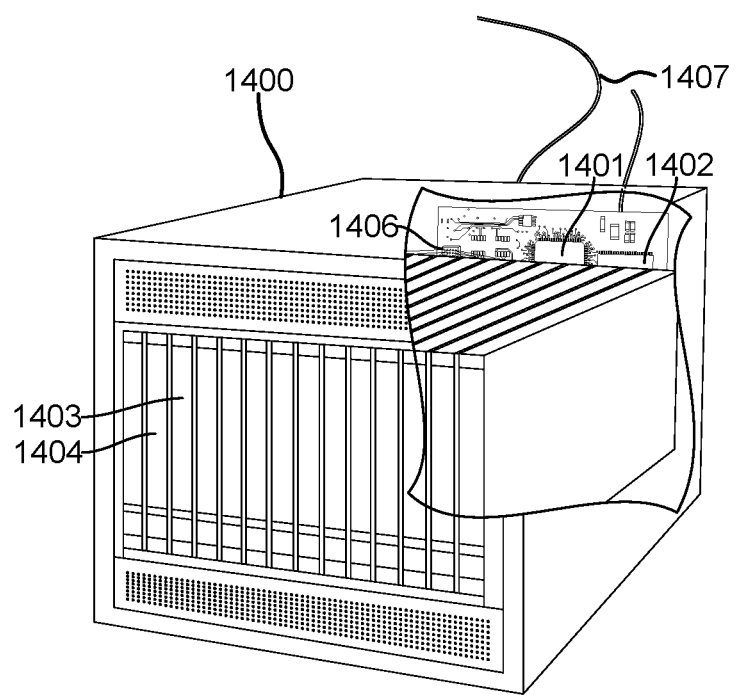
FIG. 14 is a component block diagram of a server suitable for use with an embodiment.

The embodiments described above, including the DTRA and transportation resource arbitrage functions, may be implemented on any of a variety of commercially available server devices, such as the server 1400 illustrated in FIG. 14. Such a server 1400 typically includes a processor 1401 coupled to volatile memory 1402 and a large capacity nonvolatile memory, such as a disk drive 1403. The server 1400 may also include a floppy disc drive, compact disc (CD) or DVD disc drive 1404 coupled to the processor 1401. The server 1400 may also include network access ports 1406 coupled to the processor 1401 for establishing data connections with a network 1407, such as a local area network coupled to other communication system computers and servers.

The processors 1301, 1401, may be any programmable microprocessor, microcomputer or multiple processor chip or chips that can be configured by software instructions (applications) to perform a variety of functions, including the functions of the various embodiments described below. In some wireless devices, multiple processors 1401 may be provided, such as one processor dedicated to wireless communication functions and one processor dedicated to running other applications. Typically, software applications may be stored in the internal memory 1302, 1402, before they are accessed and loaded into the processor 1301, 1401. The processor 1301, 1401 may include internal memory sufficient to store the application software instructions. In some servers, the processor 1401 may include internal memory sufficient to store the application software instructions. In some receiver devices, the secure memory may be in a separate memory chip coupled to the processor 1301. The internal memory 1302, 1402 may be a volatile or nonvolatile memory, such as flash memory, or a mixture of both. For the purposes of this description, a general reference to memory refers to all memory accessible by the processor 1301, 1401, including internal memory 1302, 1402, removable memory plugged into the device, and memory within the processor 1301, 1401 itself.

FIG. 15 illustrates an example corridor configuration vehicular occupancy opportunity element/unit grouping in accordance with various embodiments. As discussed above, each vehicular occupancy opportunity element/unit (VOO) may define an amount of transportation resource (e.g., 100 miles on Rte-1) in relation to a well-defined resource boundary (e.g., lanes of the highway, area between Richmond and Washington D.C., etc.). In addition, each VOO may include information identifying various characteristics and/or properties of the transportation resource or the resource offering, such as the specific access way/roadway, the geographic area(s) in which the resource is offered for use, a resource availability time or date, a resource expiration time, a lease duration, lease start and stop times or dates, an entryway/exit way status, the service class of the resource or offering, etc.

In the example illustrated in FIG. 15, there are three lanes (i.e., L1, L2, and L3) of transportation resources available. The first lane L1 includes a first grouping of vehicular occupancy opportunity elements/units (i.e., VOOs 11, 12, 13, 14, 15, and 1X), and second first lane L2 includes a second grouping of vehicular occupancy opportunity elements/units (i.e., VOOs 21, 22, 23, 24, 25, and 2X). The third lane L3 may be an open or "free" lane that is not organized into vehicular occupancy opportunity elements/units. VOO 11 may define a first segment of road within the first lane L1, VOO 12 may define a second segment of road within the first lane L1, etc. Similarly, VOO 21 may define a first segment of road within the second lane L2, VOO 22 may define a second segment of road within the second lane L2, etc. Each of these segments may be associated with a speed or congestion value. For example, the VOO 11 may include a speed value that indicates that a vehicle may travel over its associated segment at speeds up to 70 miles per hour, whereas the VOO 21 may include a speed value that indicates that the vehicle may travel over its associated segment at speeds up to 50 miles per hour. As such, the value of VOO 11 may be greater than the value of VOO 21 to a purchaser or lessee.

A DPC 146 component may be configured to dynamically manage the availability, allocation, access, and use of the available transportation resources (e.g., the three lanes L1, L2 and L3). For example, the DPC 146 component may monitor the location and position of a vehicle as it travels down the roadway in the third lane L3. When the vehicle begins to change lanes and/or otherwise requests to enter the second lane L2, the DPC 146 component may determine whether VOOs 21 through 2X are available (e.g., based on number of units outstanding, the amount of traffic in the second lane L2, etc.), and offer the available VOO units for allocation to the vehicle (e.g., by communicating with a computing device in the vehicle, etc.). The DPC 146 may receive a bid from the vehicle for the access or use of the second lane (VOOs 21 through 2X), determine that the vehicle is a winning bidder, send a message to a charging system to receive payment for the relevant VOOs, allocate the relevant VOOs to the vehicle (e.g., by updating a transaction database, etc.), and authorize the vehicle to enter and use the segments associated with the allocated VOOs. The DPC 146 component may continue monitoring the location and position of the vehicle as it travels down the second lane L2, and any or all of the above operations repeated when the vehicle moves from the second lane L2 into the first lane L1.

FIG. 16 illustrates components and operations in a system 1600 configured to perform dynamic transportation resources arbitrage (DTRA) operations for allocating the rights for the access and use of a transportation resource associated with a vehicular occupancy opportunity element/unit or group of vehicular occupancy opportunity elements/units in accordance with an embodiment. In the example illustrated in FIG. 16, the system 1600 includes DPC 146 component that is configured to communicate with a first DRC 144a component in a first network/system 1602, a second DRC 144b component in a second network/system 1604, a third DRC 144c component in a third network/system 1606, and a fourth DRC 144d component in a fourth network/system 1608. Each of the DRCs 144a, 144b, 144c, and 144d may be responsible for managing different type or category of vehicular occupancy opportunity elements/units. For example, the first DRC 144a may be configured to request, submit bids on, receive, allocate, and monitor the use of vehicular occupancy opportunity elements/units for commercial aircraft, chartered aircraft, and drone navigation. The second DRC 144b may be configured to request, submit bids on, receive, allocate, and monitor the use of vehicular occupancy opportunity elements/units for highway traffic, bridges and tunnels, and secondary roads. The third DRC 144c may be configured to request, submit bids on, receive, allocate, and monitor the use of vehicular occupancy opportunity elements/units for inter-coastal shipping lanes and sea shipping lanes. The fourth DRC 144d may be configured to request, submit bids on, receive, allocate, and monitor the use of vehicular occupancy opportunity elements/units for garage parking and street parking.

FIG. 17 illustrates components and operations in a system 1700 configured to perform dynamic transportation resources arbitrage (DTRA) operations in accordance with another embodiment. In the example illustrated in FIG. 17, the system 1700 includes a transportation resource commodity exchange (TRCE) 1702 component, an over-the-counter corridor trading (OCT) 1704 component, a DPC 146 component, a first DRC 144a component, a second DRC 144b component, a third DRC 144c component, and a fourth DRC 144d component. In some embodiments, the TRCE 1702 component and/or the OCT 1704 component may be included in, or implemented as part of, the DPC 146 component.

Each of the DRCs 144 may be responsible for controlling or managing different type or category of transportation resources. For example, the first DRC 144a may be responsible for managing aircraft resources, the second DRC 144b may be responsible for managing roadway resources, the third DRC 144c may be responsible for managing shipping lane resources, and the fourth DRC 144d may be responsible for managing vehicular storage resources (parking, etc.).

The OCT 1704 component may be configured to group resource cubes to generate a corridor cluster that covers lanes in a highway, bridges and other similar areas, and send information identifying the grouped vehicular occupancy opportunity elements/units or corridor cluster to the DPC 146 component and/or the TRCE 1702 component. For example, the OCT 1704 component may generate a corridor cluster that covers the licensing of a lane over the George Washington Bridge during peak hours of usage. As a further example, the OCT 1704 component may group the vehicular occupancy opportunity elements/units so as to allow the DPC 146 component to offer transportation resources that cover the inbound upper and lower deck of the George Washington Bridge for morning rush hour, and the outbound lower deck during the evening rush hour.

The TRCE 1702 component may be configured to perform various operations to allow participants to buy, sell, and exchange vehicular occupancy opportunity elements/units or groups of vehicular occupancy opportunity elements/units. For example, the TRCE 1702 may component may be configured to receive information identifying corridor cluster from the OCT 1704 component, pool or package the vehicular occupancy opportunity elements/units associated with the corridor cluster into a resource package, and offer the resource package for auction via the DPC 146 component. For example, the TRCE component 1702 may broadcast information that identifies the corridor cluster, and receive resource bids for the right to access and use the corridor cluster from the DRC 144a-d components via the DPC 146 component. The TRCE component 1702 may identify the DRC 144 that submitted highest bid as the winner of the resource, and instruct the DPC 146 component to allocate the corridor cluster to the winning DRC 144.

Figure 18:
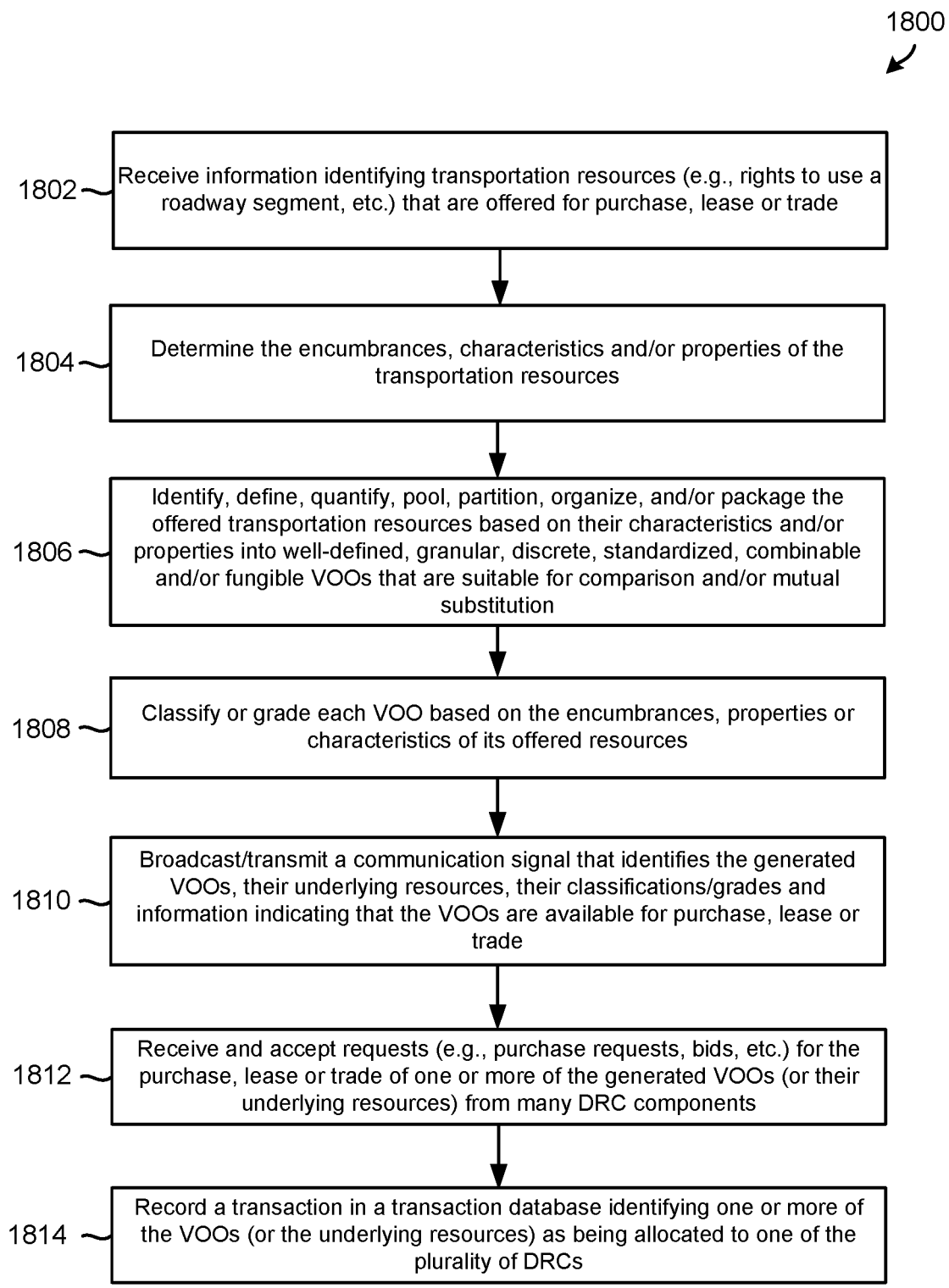
FIG. 18 is a process flow diagram illustrating a DTRA method of dynamically managing the availability, allocation, access, and use of transportation resources in accordance with an embodiment.

FIG. 18 illustrates a dynamic transportation resource arbitrage (DTRA) method 1800 of generating and using vehicular occupancy opportunity elements/units in accordance with an embodiment. DTRA method 1800 may be performed by one or more processors of one or more server computing devices that implement all or portions of a DPC component. In block 1802, a processor of the DPC component may receive information identifying transportation resources (e.g., rights to use a roadway segment, etc.) that are offered for purchase, lease or trade. In block 1804, the processor may determine the encumbrances, characteristics and/or properties of the transportation resources that are offered for purchase, lease or trade.

In block 1806, the processor may identify, define, quantify, pool, partition, organize, and/or package the offered transportation resources based on their characteristics and/or properties into well-defined, granular, discrete, standardized, combinable and/or fungible vehicular occupancy opportunity elements/units that are suitable for comparison and/or mutual substitution. For example, in block 1806, the processor may generating granular vehicular occupancy opportunity elements/units that each identify an amount of a transportation resource that is offered for allocation and use by travelers with respect to an area. In block 1808, the processor may classify or grade each vehicular occupancy opportunity element/unit based on the encumbrances, properties or characteristics of its offered resources. In some embodiments, the processor may combine the granular vehicular occupancy opportunity elements/units to cover a specific corridor (e.g., an area that encompasses a lane in a highway, a bridge, an air traffic corridor, etc.) in block 1808. In block 1810, the processor may broadcast or transmit a communication signal that identifies the generated vehicular occupancy opportunity elements/units, their underlying resources, their classifications/grades and information indicating that the vehicular occupancy opportunity elements/units are available for purchase, lease or trade. In block 1812, the processor may receive and accept requests (e.g., purchase requests, bids, etc.) for the purchase, lease or trade of one or more of the generated vehicular occupancy opportunity elements/units from many DRC 144 components. In block 1814, the processor may identify a winning bid and/or winning DRC 144 component, and record a transaction in a transaction database identifying one or more of the vehicular occupancy opportunity elements/units as being allocated to the winning DRC 144 component.

As used in this application, the terms "transportation vehicle" and "vehicle" may be interchangeable and/or used to denote any passenger vehicle capable of accessing the various modalities of a modern transportation grid. Non-limiting examples of such vehicles may include automobiles, motorcycles, boats, trains, submersibles, dirigible airships, or planes. Transportation vehicles may further include manual vehicles such as bicycles. While the embodiments described herein are directed towards automobiles and motorcycles, the systems and methods may be generally useful to allocating resources of any component of a transportation grid irrespective of the modality of transit.

As used in this application, the terms "mobile device," "console unit", "cellular telephone," and "cell phone" may be interchangeable and used to refer to any one or all of integrated or add-on transportation vehicle component devices, cellular telephones, smartphones, personal data assistants (PDA's), laptop computers, tablet computers, ultrabooks, palm-top computers, wireless electronic mail receivers, multimedia Internet enabled cellular telephones, wireless gaming controllers, and similar personal electronic devices which include a programmable processor, a memory and circuitry for sending and/or receiving wireless communication signals. While some embodiments are particularly useful in mobile devices, such as cellular telephones, these embodiments are generally useful in any computing device that may be used to wirelessly communicate information.

As used in this application, the term "charging system" refers to one or more components (e.g., server computing devices, etc.) that are closely associated with a bank, credit union, or other financial institution where funds may be managed or stored and payments processed. A charging system component may be configured receive requests for payment, attribute the request to a user account, deduct funds from the user account, submit payment information to a financial institution of the payment requester (e.g., settling transactions), and perform other similar operations.

As used in this application, the terms "wireless network", "network", "cellular system", "cell tower" and "radio access point" may interchangeable and used to refer to any one of various wireless mobile systems or components for wirelessly communicating information. In an embodiment, a wireless network may be a radio access point (e.g., a cell tower), which provides the radio link to the mobile device so that the mobile device may communicate with components in the core network.

As used in this application, the terms "component," "module," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, a computer, a server, network hardware, etc. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), public switched telephone network (PSTN), Wi-Fi Protected Access I & II (WPA, WPA2), Bluetooth®, integrated digital enhanced network (iden), and land mobile radio (LMR). Each of these technologies involves, for example, the transmission and reception of voice, data, signaling and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

A number of different methods, technologies, solutions, and/or techniques (herein collectively "solutions") are currently available for determining the location of mobile device, any or all of which may be implemented by, included in, and/or used by the various embodiments. Such solutions include, e.g., global positioning system (GPS) based solutions, assisted GPS (A-GPS) solutions, and cell-based positioning solutions such as cell of origin (COO), time of arrival (TOA), observed time difference of arrival (OT-DOA), advanced forward link trilateration (AFLT), and angle of arrival (AOA). In various embodiments, such solutions may implemented in conjunction with one or more wireless communication technologies and/or networks, including wireless wide area networks (WWANs), wireless local area networks (WLANs), wireless personal area networks (WPANs), and other similar networks or technologies. By way of example, a WWAN may be a Code Division Multiple Access (CDMA) network, a Frequency Division Multiple Access (FDMA) network, an OFDMA network, a 3GPP LTE network, a WiMAX (IEEE 802.16) network, and so on. The WPAN may be a Bluetooth network, an IEEE 802.15x network, and so on. A WLAN may be an IEEE 802.11x network, and so on. A CDMA network may implement one or more radio access technologies (RATs) such as CDMA2000, Wideband-CDMA (W-CDMA), and so on.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, But such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSC), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, But, in the alternative, the processor may be any conventional processor, controller, microcontroller, or state machine A processor may also be implemented as a combination of computing devices, e.g., a combination of a DPC and a microprocessor, a plurality of microprocessors, one or more microprocessors in conjunction with a DPC core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example But not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein But is to be accorded the widest scope consistent with the following claims and the principles and novel features disclosed herein.

What is claimed is:

1. A method of dynamically managing transportation resources by a server computing device deployed in a communication network, the method comprising:
   generating, via a processor in the server computing device, granular vehicular occupancy opportunity units that each comprise an information structure identifying characteristics of a transportation resource that is offered for allocation and use by travelers,
      wherein the characteristics include at least an amount of the transportation resource with respect to a physical space, and
      wherein the vehicular occupancy opportunity units may be combined to cover a precise location or area;
   combining, via the processor, the vehicular occupancy opportunity units to cover a geographical area that encompasses a highway, bridge, navigation path, waterway, or air traffic corridor; and broadcasting to users, over the communication network, a signal with information offering the combined vehicular occupancy opportunity units for purchase, lease, or trade.

2. The method of claim 1, wherein generating the granular vehicular occupancy opportunity units comprises generating vehicular occupancy opportunity units that use a universal standard to identify, quantify, measure, and/or represent the transportation resource.

3. The method of claim 1, wherein generating the granular vehicular occupancy opportunity units comprises generating vehicular occupancy opportunity units that include or provide a common reference point against which other vehicular occupancy opportunity units and transportation resources may be compared.

4. The method of claim 3, further comprising
comparing two or more vehicular occupancy opportunity units that represent different resource offerings from different lessor parties to determine the relative economic value of the offered amounts of transportation resource.

5. The method of claim 1, wherein generating the granular vehicular occupancy opportunity units comprises generating vehicular occupancy opportunity units defined by an amount of distance along a section of transportation grid through an area encompassing one square meter or volume encompassing one cubic meter.

6. The method of claim 1, further comprising:
receiving bids for the offered vehicular occupancy opportunity unit;
determining one or more winning bids associated with registered users;
submitting the winning bids to a charging system for payment; and
allocating the vehicular occupancy opportunity units to users having winning bids.

7. The method of claim 1, wherein combining the vehicular occupancy opportunity units comprises grouping the vehicular occupancy opportunity units to form a polygon; and
wherein the group of combined vehicular occupancy opportunity units is offered for purchase, lease, or trade on a commodities exchange.

8. A server computing device, comprising:
a memory; and
a processor coupled to the memory, wherein the processor is configured with processor-executable instructions to perform operations comprising:
generating granular vehicular occupancy opportunity units that each comprise an information structure identifying characteristics of a transportation resource that is offered for allocation and use by travelers, wherein the characteristics include at least an amount of the transportation resource with respect to a physical space, and wherein the vehicular occupancy opportunity units may be combined to cover a precise location or area;
combining the vehicular occupancy opportunity units to cover a geographical area that encompasses a highway, bridge, navigation path, waterway, or air traffic corridor; and
broadcasting to users, over a communication network, a signal with information offering the combined vehicular occupancy opportunity units for purchase, lease, or trade.

9. The server computing device of claim 8, wherein the processor is configured with processor-executable instructions to perform operations such that generating the granular vehicular occupancy opportunity units comprises generating vehicular occupancy opportunity units that use a universal standard to identify, quantify, measure, and/or represent the transportation resource.

10. The server computing device of claim 8, wherein the processor is configured with processor-executable instructions to perform operations such that generating the granular vehicular occupancy opportunity units comprises generating vehicular occupancy opportunity units that include or provide a common reference point against which other vehicular occupancy opportunity units and transportation resources may be compared.

11. The server computing device of claim 10, wherein the processor is configured with processor-executable instructions to perform operations further comprising
comparing two or more vehicular occupancy opportunity units that represent different resource offerings from different lessor parties to determine the relative economic value of the offered amounts of transportation resource.

12. The server computing device of claim 8, wherein the processor is configured with processor-executable instructions to perform operations such that generating the granular vehicular occupancy opportunity units comprises generating vehicular occupancy opportunity units defined by an amount of distance along a section of transportation grid through an area encompassing one square meter or volume encompassing one cubic meter.

13. The server computing device of claim 8, wherein the processor is configured with processor-executable instructions to perform operations further comprising:
receiving bids for the offered vehicular occupancy opportunity unit;
determining one or more winning bids associated with registered users;
submitting the winning bids to a charging system for payment; and
allocating the vehicular occupancy opportunity units to users having winning bids.

14. The server computing device of claim 11, wherein the processor is configured with processor-executable instructions to perform operations such that combining the vehicular occupancy opportunity units comprises grouping the vehicular occupancy opportunity units to form a polygon, wherein the group of combined vehicular occupancy opportunity units is offered for purchase, lease, or trade on a commodities exchange.

15. A non-transitory computer readable storage medium having stored thereon processor-executable software instructions configured to cause a processor to perform operations comprising:
generating granular vehicular occupancy opportunity units that each comprise an information structure identifying characteristics of a transportation resource that is offered for allocation and use by travelers, wherein the characteristics include at least an amount of the transportation resource with respect to a physical space, and wherein the vehicular occupancy opportunity units may be combined to cover a precise location or area;
combining the vehicular occupancy opportunity units to cover a geographical area that encompasses a highway, bridge, navigation path, waterway, or air traffic corridor; and broadcasting to users, over a communication network, a signal with information offering the combined vehicular occupancy opportunity units for purchase, lease, or trade.

16. The non-transitory computer readable storage medium of claim 15, wherein the stored processor-executable software instructions are configured to cause a processor to perform operations such that generating the granular vehicular occupancy opportunity units comprises generating vehicular occupancy opportunity units that use a universal standard to identify, quantify, measure, and/or represent the transportation resource.

17. The non-transitory computer readable storage medium of claim 15, wherein the stored processor-executable software instructions are configured to cause a processor to perform operations such that generating the granular vehicular occupancy opportunity units comprises generating vehicular occupancy opportunity units that include or provide a common reference point against which other vehicular occupancy opportunity units and transportation resources may be compared.

18. The non-transitory computer readable storage medium of claim 17, wherein the stored processor-executable software instructions are configured to cause a processor to perform operations further comprising:
comparing two or more vehicular occupancy opportunity units that represent different resource offerings from different lessor parties to determine the relative economic value of the offered amounts of transportation resource.

19. The non-transitory computer readable storage medium of claim 15, wherein the stored processor-executable software instructions are configured to cause a processor to perform operations such that generating the granular vehicular occupancy opportunity units comprises generating vehicular occupancy opportunity units defined by an amount of distance along a section of transportation grid through an area encompassing one square meter or volume encompassing one cubic meter.

20. The non-transitory computer readable storage medium of claim 15, wherein the stored processor-executable software instructions are configured to cause a processor to perform operations further comprising:
receiving bids for the offered vehicular occupancy opportunity unit;
determining one or more winning bids associated with registered users;
submitting the winning bids to a charging system for payment; and
allocating the vehicular occupancy opportunity units to users having winning bids.

21. The non-transitory computer readable storage medium of claim 15, wherein the stored processor-executable software instructions are configured to cause a processor to perform operations such that combining the vehicular occupancy opportunity units for comprises grouping the vehicular occupancy opportunity units to form a polygon, wherein the group of combined vehicular occupancy opportunity units is offered for purchase, lease, or trade on a commodities exchange.

\* \* \* \* \*